(12) United States Patent  (10) Patent No.: US 8,834,041 B2
Ertel et al.  (45) Date of Patent: Sep. 16, 2014

(54) FERRULE-BASED OPTICAL COMPONENT ASSEMBLIES

(75) Inventors: John P. Ertel, Half Moon Bay, CA (US); Gary R. Trott, San Mateo, CA (US)

(73) Assignee: Corning Cable Systems LLC, Hickory, NC (US)

( * ) Notice: Subject to any disclaimer, the term of this patent is extended or adjusted under 35 U.S.C. 154(b) by 198 days.

(21) Appl. No.: 13/248,441

(22) Filed: Sep. 29, 2011

(65) Prior Publication Data

US 2013/0084043 A1    Apr. 4, 2013

(51) Int. Cl.
*G02B 6/36* (2006.01)
*G02B 6/42* (2006.01)
*G02B 6/38* (2006.01)

(52) U.S. Cl.
CPC ............ *G02B 6/3817* (2013.01); *G02B 6/4261* (2013.01); *G02B 6/4246* (2013.01)
USPC .................... 385/89; 385/49; 385/52; 385/92

(58) Field of Classification Search
USPC ............ 385/49, 51, 52, 88–94; 398/135, 139
See application file for complete search history.

(56) References Cited

U.S. PATENT DOCUMENTS

| | | | |
|---|---|---|---|
| 4,720,630 A | 1/1988 | Takeuchi et al. | 250/227 |
| 5,065,011 A | 11/1991 | Fujihara et al. | 250/227.24 |
| 5,101,465 A | 3/1992 | Murphy | 385/88 |
| 5,247,597 A | 9/1993 | Blacha et al. | 385/88 |
| 5,259,054 A | 11/1993 | Benzoni et al. | 385/89 |
| 5,337,398 A | 8/1994 | Benzoni et al. | 385/90 |
| 5,631,987 A | 5/1997 | Lasky et al. | 385/88 |
| 5,993,075 A | 11/1999 | Huang et al. | 385/92 |
| 6,302,596 B1 * | 10/2001 | Cohen et al. | 385/93 |
| 6,312,167 B1 | 11/2001 | Kim et al. | 385/89 |
| 6,328,482 B1 | 12/2001 | Jian | 385/88 |
| 6,364,541 B1 | 4/2002 | Nesnidal et al. | 385/92 |
| 6,453,091 B2 * | 9/2002 | Kawai | 385/33 |

(Continued)

FOREIGN PATENT DOCUMENTS

| EP | 2175296 A1 | 4/2010 | G02B 6/42 |
|---|---|---|---|
| JP | 55-100514 A | 7/1980 | G02B 7/26 |

(Continued)

OTHER PUBLICATIONS

Patent Cooperation Treaty, International Search Report and Written Opinion, International Application No. PCT/US2012/057809; Mailing Date Apr. 26, 2013—20 pages.

*Primary Examiner* — Daniel Petkovsek

(57) ABSTRACT

In one embodiment, an optical transceiver assembly includes an active component substrate, first and second fiber securing devices, and a holder device coupled to the active component substrate. The holder device includes an active optical component recess that encloses a first and second active optical component of the active component assembly, and first and second fiber-locating holes having an engagement feature at the active optical component recess such that an end of first and second fibers inserted into the first and second fiber-locating holes are aligned with the first and second active optical components along the x-, y-, and z-axes. In another embodiment, an optical component assembly includes an active component substrate having a solder ring, a fiber securing device, and an active optical component on the active component substrate. The fiber securing device is aligned with the active optical component by the solder ring.

9 Claims, 24 Drawing Sheets

(56) References Cited

U.S. PATENT DOCUMENTS

| | | | |
|---|---|---|---|
| 6,527,455 B2 | 3/2003 | Jian | 385/88 |
| 6,709,170 B2 | 3/2004 | Tartaglia et al. | 385/94 |
| 6,826,336 B2 | 11/2004 | Guy | 385/49 |
| 6,874,952 B2 | 4/2005 | Nishimura | 385/89 |
| 6,877,911 B2 | 4/2005 | Ide et al. | 385/88 |
| 7,093,986 B2 | 8/2006 | Scofet et al. | 385/92 |
| 7,101,090 B2 * | 9/2006 | Cheng et al. | 385/88 |
| 7,192,200 B2 * | 3/2007 | Casati et al. | 385/89 |
| 7,347,632 B2 * | 3/2008 | Farr | 385/89 |
| 7,418,175 B2 * | 8/2008 | Aizpuru et al. | 385/52 |
| 7,449,674 B2 * | 11/2008 | Ueno et al. | 250/227.24 |
| 7,606,499 B2 | 10/2009 | Pan et al. | 398/164 |
| 7,728,399 B2 | 6/2010 | Walberg et al. | 257/434 |
| 7,731,433 B1 * | 6/2010 | Heinemann et al. | 385/93 |
| 7,773,836 B2 | 8/2010 | De Dobbelaere | 385/14 |
| 2004/0252951 A1 | 12/2004 | Nagasaka et al. | 385/88 |
| 2005/0025436 A1 | 2/2005 | Saito et al. | 385/88 |
| 2005/0175292 A1 | 8/2005 | Supper | 385/88 |
| 2006/0039658 A1 | 2/2006 | Furuyama et al. | 385/90 |
| 2009/0092356 A1 | 4/2009 | Yasuda et al. | 385/31 |
| 2009/0097858 A1 | 4/2009 | De Pauw | 398/139 |
| 2009/0220200 A1 | 9/2009 | Wong et al. | 385/89 |
| 2013/0084044 A1 * | 4/2013 | Ertel et al. | 385/88 |

FOREIGN PATENT DOCUMENTS

| | | | |
|---|---|---|---|
| JP | 8-005872 A | 1/1996 | G02B 6/42 |
| JP | 2000-221368 A | 8/2000 | G02B 6/42 |
| JP | 2004-317627 A | 11/2004 | G02B 6/42 |
| WO | WO 94/28448 A1 | 12/1994 | G02B 6/00 |

\* cited by examiner

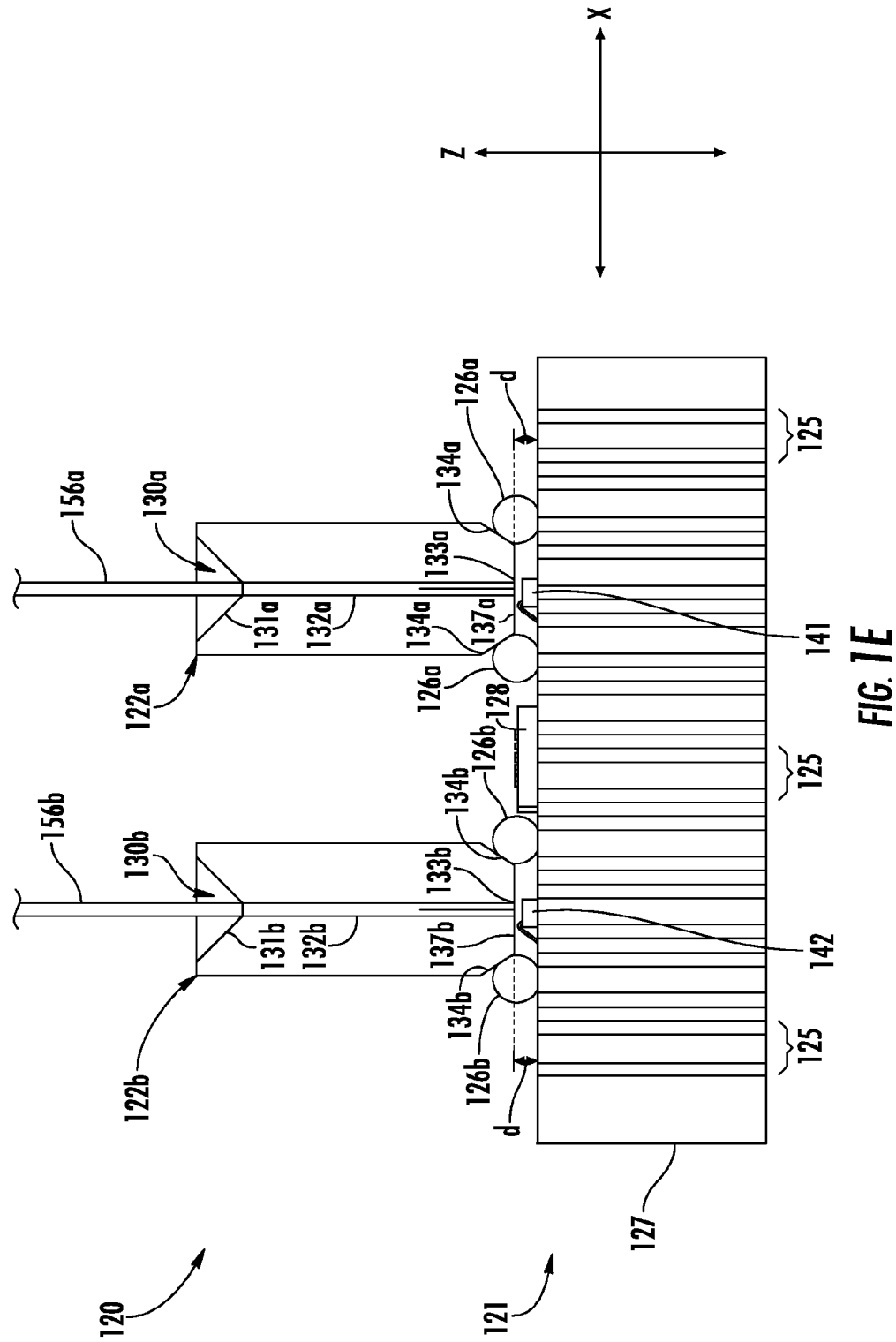

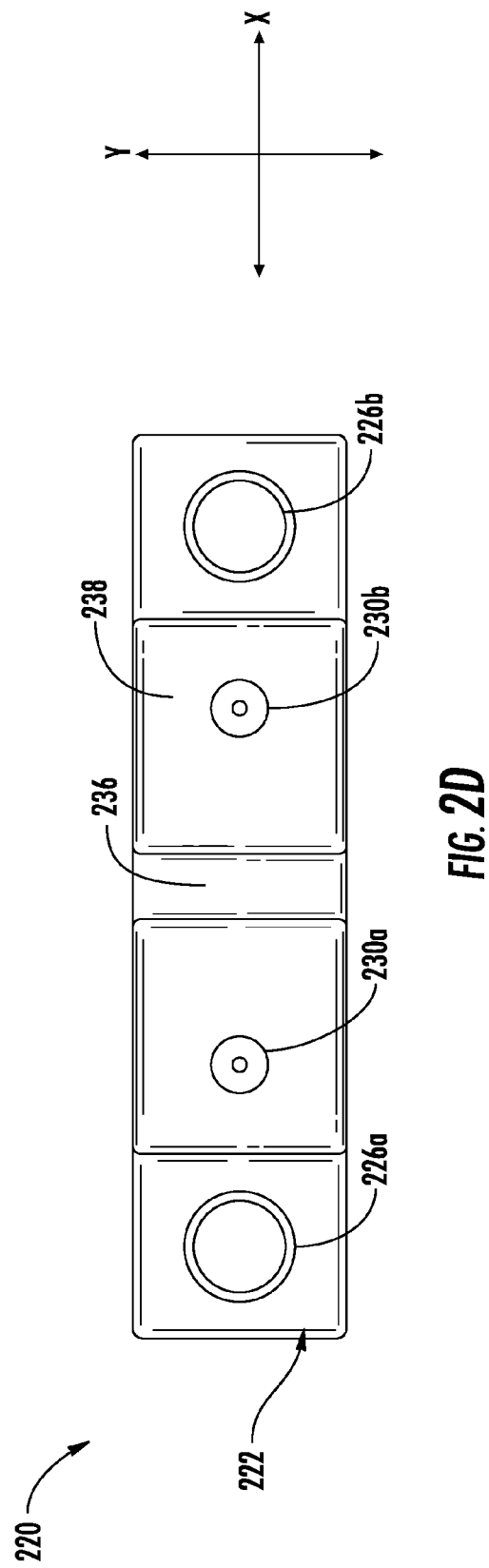

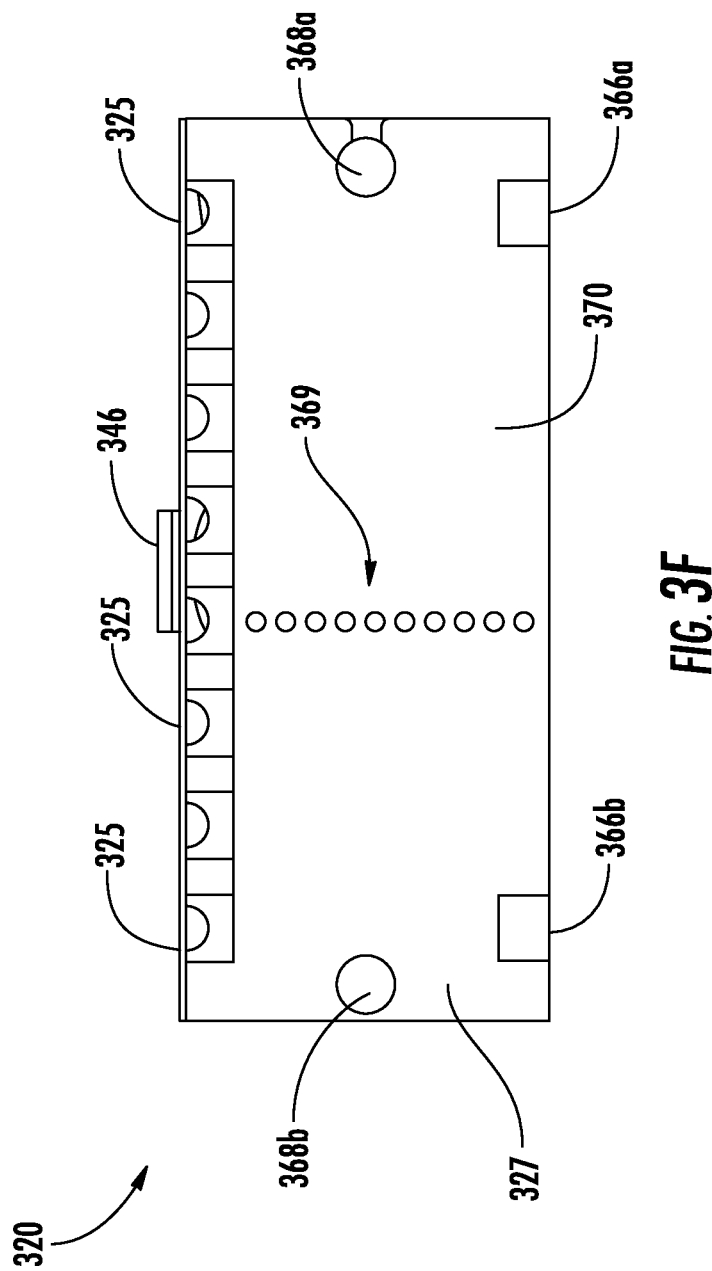

FERRULE-BASED OPTICAL COMPONENT ASSEMBLIES

BACKGROUND

1. Field

The present disclosure generally relates to optical component assemblies for optically coupling an optical fiber to an active optical component, such as a laser diode or a photodiode.

2. Technical Background

Fiber optic cables are an attractive alternative to bulky traditional conductor cables (e.g., copper), especially as data rates increase. As the use of fiber optics migrates into numerous consumer electronics applications, such as connecting computer peripherals by the use of fiber optic cable assemblies, there will be a consumer-driven expectation for cables having improved performance, compatibility with future communication protocols, and a broad range of use. For example, it is likely that consumer demand will be for a fiber optic cable that is compatible with universal serial bus specification version 3.0 (USB 3.0). Devices that communicate using electronic communication protocols (e.g., USB 3.0) require an electro-mechanical interface, such as a USB plug. However, conventional fiber-coupled transceivers have industry standardized connections to define an opto-mechanical interface for the installation and removal of fiber optic cables using standardized plugs and jacks.

Accordingly, alternative optical component assemblies, such as optical transceiver assemblies, and active optical cable assemblies that enable electro-mechanical interfaces with electronics devices are desired.

SUMMARY

Embodiments of the present disclosure relate to optical component assemblies and, more specifically, to optical component assemblies having a fiber securing assembly is configured to align an end of a fiber optic cable with an active optical component, (e.g, a laser diode or a photodiode). Features of the fiber securing component may allow the fiber securing assembly to be passively aligned with, and coupled to, the substrate such that the ends of optical fibers maintained by the fiber securing component are secured and substantially located at a specific, spatial optical coupling location with respect to the active optical component. Embodiments also relate to optical transceiver assemblies for optically coupling optical fibers to a light emitting component and a light receiving component, and active optical cable assemblies having an optical fiber(s) optically coupled to an active optical component.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1E schematically depicts a partial cross-sectional, side view of the optical component assembly depicted in FIG. 1C according to one or more embodiments shown and described herein;

FIG. 2D schematically depicts a top view of the optical component assembly depicted in FIG. 2A according to one or more embodiments shown and described herein;

FIG. 3F schematically depicts a bottom view of the optical component assembly depicted in FIG. 3A according to one or more embodiments shown and described herein;

DETAILED DESCRIPTION

Some aspects of the present disclosure are directed to optical component assemblies, optical transceiver assemblies and active optical cable assemblies. According to various embodiments, the optical component assemblies, the optical transceiver assemblies and the active optical cable assemblies described herein may utilize cost effective means to accurately position optical fibers relative to active components (e.g., photodiodes or laser diodes of a transceiver circuit) by passive alignment means. Embodiments described herein utilize a fiber securing assembly having an alignment component to precisely guide and position an end of an optical fiber relative to the active component in x-, y-, and z-axis directions.

Embodiments may be utilized in, or otherwise related to, active optical cable assemblies that communicatively couple a host device to a client device, such as an electro-optical cable, wherein electrical signals generated by a host or client device are converted to optical signals by a transceiver circuit and transmitted over one or more optical fibers. Optical signals received by a host or client end of the active optical cable assembly are converted from optical signals into electrical signals by the transceiver circuit, wherein the electrical signals are then provided to the host or client device. Although embodiments may be illustrated and described within the context of the USB 3.0 standard, embodiments are not limited thereto. It is contemplated that embodiments may be implemented in future standards of USB, as well as other communication protocols. Optical component assemblies, optical transceiver assemblies, and active optical cable assemblies will be described in further detail herein with specific reference to the appended figures.

Generally speaking, due to the high data rates of USB 3.0 (e.g., 4.8 Gb/s), the cable length of reasonably-sized, traditional passive electrical conductor cable assemblies are limited to about 3 meters or less due to skin and dielectric losses intrinsic to electrical conductors and dielectric materials. Further, conductor cables that are compatible with USB 3.0 at the specified distance of 3 meters are very bulky and put significant stress on the small connectors that are used on laptops and consumer devices, such as cameras or camcorders. Because of these limitations, there may be interest in a fiber optic cable for use with USB 3.0. A fiber optic cable may be dramatically thinner, more flexible, easier to carry for portable use, and may put much less stress on the connectors used in small, handheld devices. Additionally, a fiber optic cable assembly may comprise cable lengths of 100+ meter spans, allowing USB 3.0 protocols (as well as other protocols) to be used in markets such as video delivery and thin-client computing.

Figure 1A:
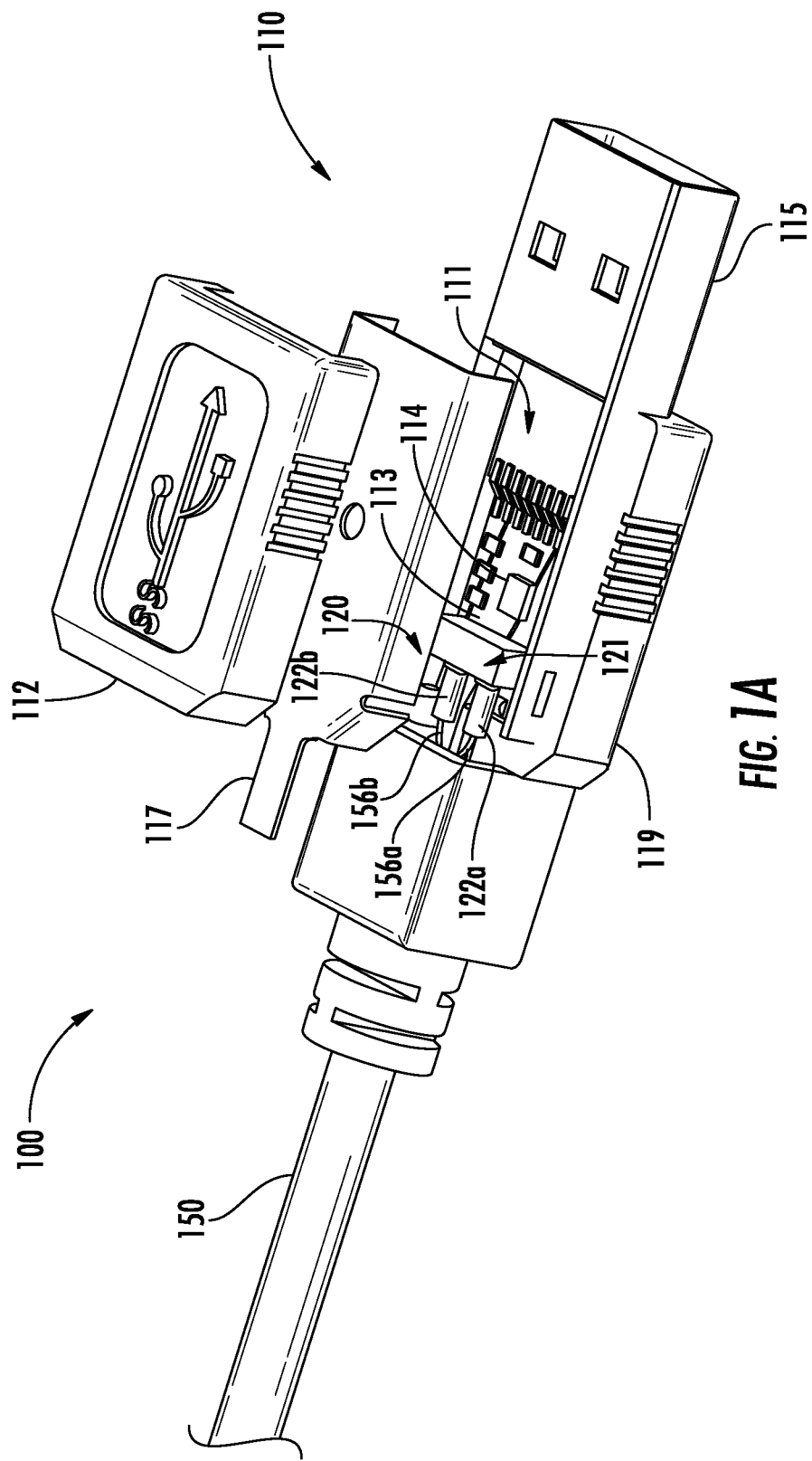
FIG. 1A schematically depicts a partially exploded, top perspective view of an active optical cable assembly according to one or more embodiments shown and described herein.

One embodiment of an active optical cable assembly 100 is illustrated in FIG. 1A. The active optical cable assembly 100 generally comprises a connector 110 and a fiber optic cable 150. A second connector (not shown) is at an opposite end of the fiber optic cable 150 from the connector 110 and includes the same components and configurations as the illustrated connector 110. The connector 110 may further comprise a top connector housing 112, a body 119, a shield 117, and a male connector end 115. It should be understood that the connector 110 may take on a variety of configurations, and that embodiments are not limited to the physical configurations of the connector 110 illustrated in FIG. 1A. For example, the male connector end may be configured as a female connector end in some embodiments, or may possess a different configuration when the active optical cable is implemented in a system that uses a communication protocol other than USB (e.g., Firewire, Thunderbolt, etc.). Accordingly, it should also be understood that no limitations are intended by the depiction of male and female connector configurations depicted in the figures.

An active circuit 111 may be positioned within the body 119 and covered by the shield 117 and the top connector housing 112. As illustrated in FIG. 1A, optical fibers 156a and 156b are mechanically coupled to the active circuit 111. The active circuit 111 may be operable to convert electrical and optical signals to provide communication between a host device and a client device over the active optical cable assembly 100 using the USB 3.0 standard in one embodiment. In the illustrated embodiment, the active circuit 111 generally comprises an optical component assembly 120, a mother printed circuit board 113, and an active integrated circuit 114. The active circuit 111 is configured to convert between the electrical and optical signals. The optical component assembly 120, and the active integrated circuit 114, may be mounted on the mother printed circuit board 113 and positioned within the body 119 of the connector 110.

FIG. 1A illustrates the active circuit 111 as comprising an optical component assembly 120 that is separate from the active integrated circuit 114. However, it is contemplated that the components of both the optical component assembly 120 and the active integrated circuit 114 may be provided in a single assembly (e.g., the active integrated circuit 114 may also be included as a component on the optical component assembly 120).

As described in more detail below, the optical component assembly 120 generally comprises an active component assembly 121, one or more active components (not shown in FIG. 1A), and a fiber securing assembly 122a/122b. The fiber securing assembly 122a/122b is utilized to precisely locate the ends of the optical fibers 156a, 156b to the active optical components of the optical component assembly 120 in the x-, y-, and z-axis directions by passive alignment. In one embodiment, the ends of the optical fibers 156a, 156b are within ±40 μm in x-, y-, and z-axis directions. As described and illustrated herein, the fiber securing assembly may take on a variety of configurations.

Figure 1B:
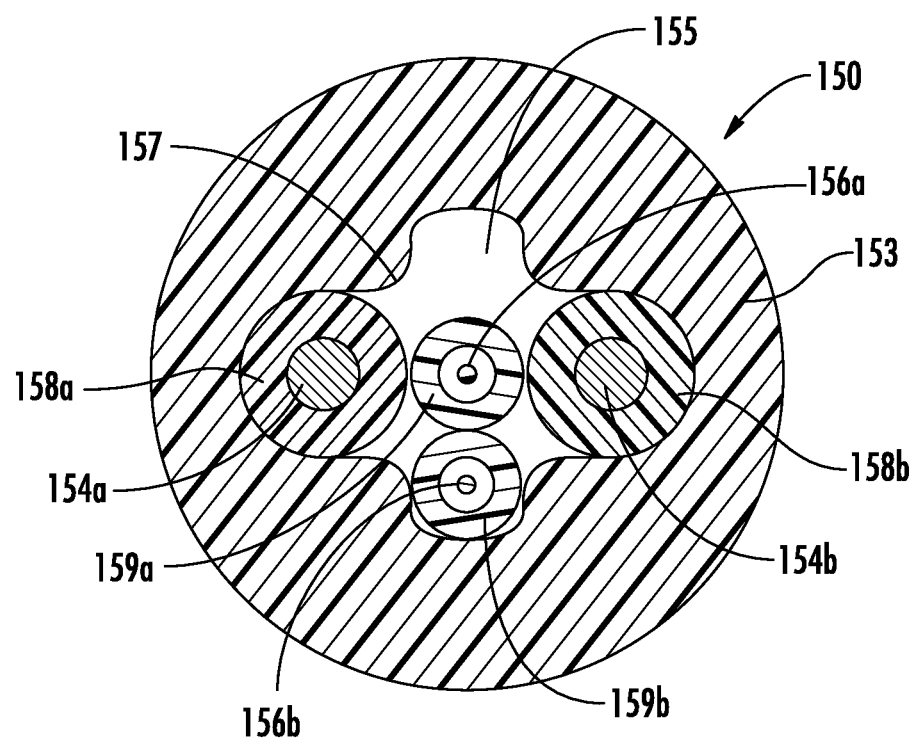
FIG. 1B schematically depicts a cross-sectional view of the fiber optical cable of the active optical cable assembly depicted in FIG. 1A according to one or more embodiments described and illustrated herein.

Any suitable fiber optic cable may be utilized for the optical fiber attach. Referring now to FIG. 1B, one non-limiting example of the fiber optic cable 150 is illustrated schematically in cross section. It should be understood that other fiber optic cable configurations may be utilized, including those with more or fewer optical fibers, as well as those with more or fewer conductors. The exemplary fiber optic cable 150 includes a polymer jacket 153 having an outer periphery and an inner periphery with the inner periphery defining a channel 155. The channel 155 is the same as an optical fiber envelope. The polymer jacket 153 may surround the channel 155 and the channel 155 may extend the entire length of the fiber optic cable 150. The fiber optic cable 150 further comprises a plurality of conductors 154a, 154b (e.g., electrically conductive wires) that may supply power to peripheral devices. The two conductors 154a, 154b are capable of electrically coupling the host active circuit to the client active circuit. For example, the two conductors 154a, 154b may receive and provide a voltage and a ground reference potential. The two conductors 154a, 154b may be made of a conductive material, such as copper. It should be understood that additional conductors may be utilized to transmit additional electrical signals through the fiber optic cable 150. In one embodiment, no conductors may be present within the fiber optic cable. The conductors 154a, 154b may be surrounded by an insulating material 158a, 158b, respectively. It is not a requirement that the conductors 154a, 154b surrounded by an insulating material 158a, 158b.

Data-carrying buffered optical fibers 156a, 156b are also included within the fiber optic cable 150. Optical fiber 156a may be configured to propagate optical signals in a first direction, and optical fiber 156b may be configured to propagate optical signals in a second direction. In another embodiment, the optical fiber 156a may comprise a plurality of optical fibers, and optical fiber 156b may also comprise a plurality of optical fibers configured to propagate optical signals in a first direction and second direction, respectively. In yet another embodiment, a single optical fiber (or a plurality of optical fibers) may be included in the fiber optic cable 150. The single optical fiber may be configured to propagate optical signals bi-directionally (e.g., by operation of a switch, a multiplexer and/or a beam splitter).

The optical fibers 156a, 156b depicted in FIG. 1B are also each surrounded by a jacket 159a, 159b. The conductors 154a, 154b and the optical fibers 156a, 156b are positioned within the channel 155. In some embodiments, the conductors 154a, 154b may be arranged within the polymer jacket 153. The optical fibers 156a, 156b are free to translate within the channel 155 when the fiber optic cable 150 is bent.

The shape of the channel 155, or optical fiber envelope 155, is established so that no matter how the fiber optic cable 150 is bent, the optical fibers 156a, 156b will never be bent below their minimum bend radius. The channel 155 as illustrated is "cross" shaped. However, there is no requirement that the channel 155 be cross shaped and may be any shape necessary to accommodate optical fiber translation so when the fiber optic cable 150 is bent, optical fibers 156a, 156b are not bent to a radius below the minimum bend radius. The channel 155 shape and orientation may also depend on the preferred of bending and locations of other elements within the fiber optic cable 150.

In some embodiments, the fiber optic cable 150 further includes a strength material, such as an aramid yarn or Kevlar. The strength material may be arranged within the channel 155. It is not required that the strength material be arranged as such, or even required, and may be arranged within the jacket 153 or the channel 155 in any convenient orientation or arrangement. The strength material may surround the optical fibers 156a, 156b and conductors 154a, 154b. The strength material may be positioned in a space between the conductors 154a, 154b, the optical fibers 156a, 156b and the jacket 153. The strength material allows the optical fibers 156a, 156b to move to a limited extent within the jacket 153. It should be understood that other arrangements of the components illustrated in FIG. 1B are within the scope of this disclosure.

In one embodiment, the fiber optic cable 150 is capable of being bent while successfully propagating optical signals. For example, the optical fibers may have a minimum bend radius of approximately 1.2 mm or greater. The minimum bend radius is the smallest radius the optical fibers 156a, 156b within the fiber optic cable 150 may be bent before excessive attenuation of the optical signals of the optical fibers 156a, 156b occurs. In one embodiment, the predetermined acceptable attenuation range is about 1.5 dB to 2.0 dB, and the minimum bend radius is about 1.2 mm or greater. It should be understood that fiber optic cables having other properties may be used.

Figure 1C:
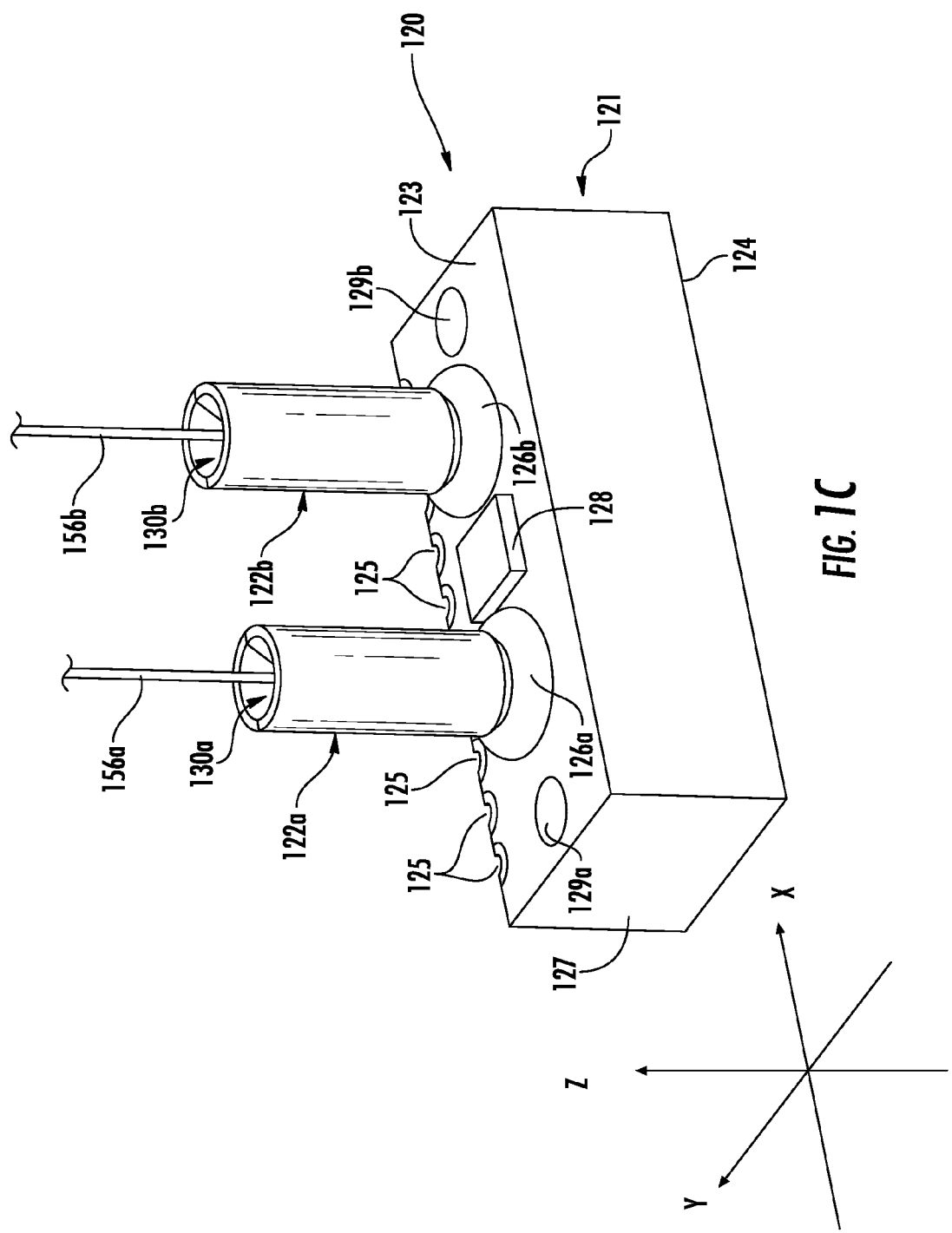
FIG. 1C schematically depicts a top perspective view of an optic component assembly having first and second fiber insertion devices coupled to first and second solder rings according to one or more embodiments shown and described herein.
Figure 1D:
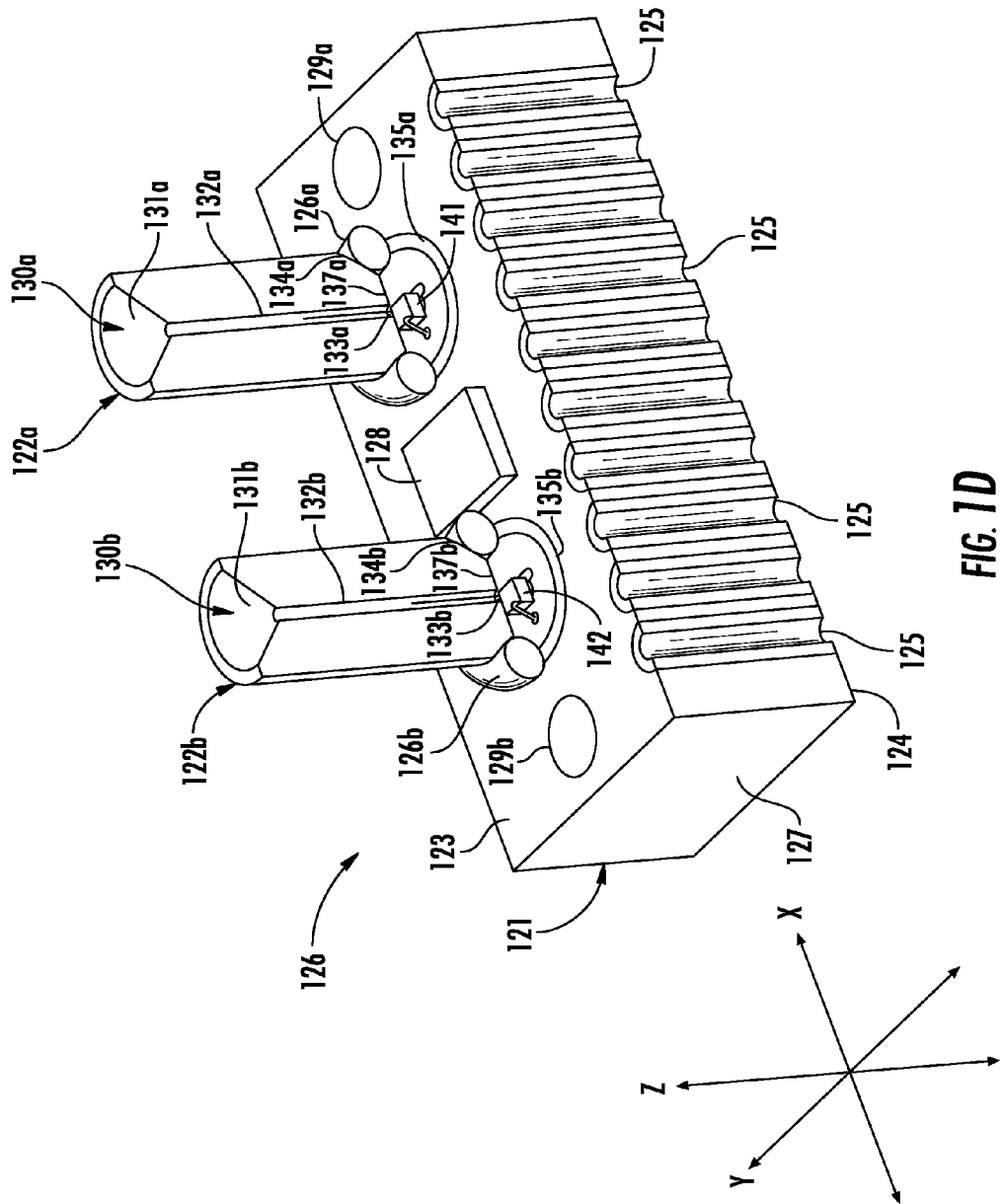
FIG. 1D schematically depicts a partial cross-sectional, top perspective view of the optical component assembly depicted in FIG. 1C according to one or more embodiments shown and described herein.
Figure 1F:
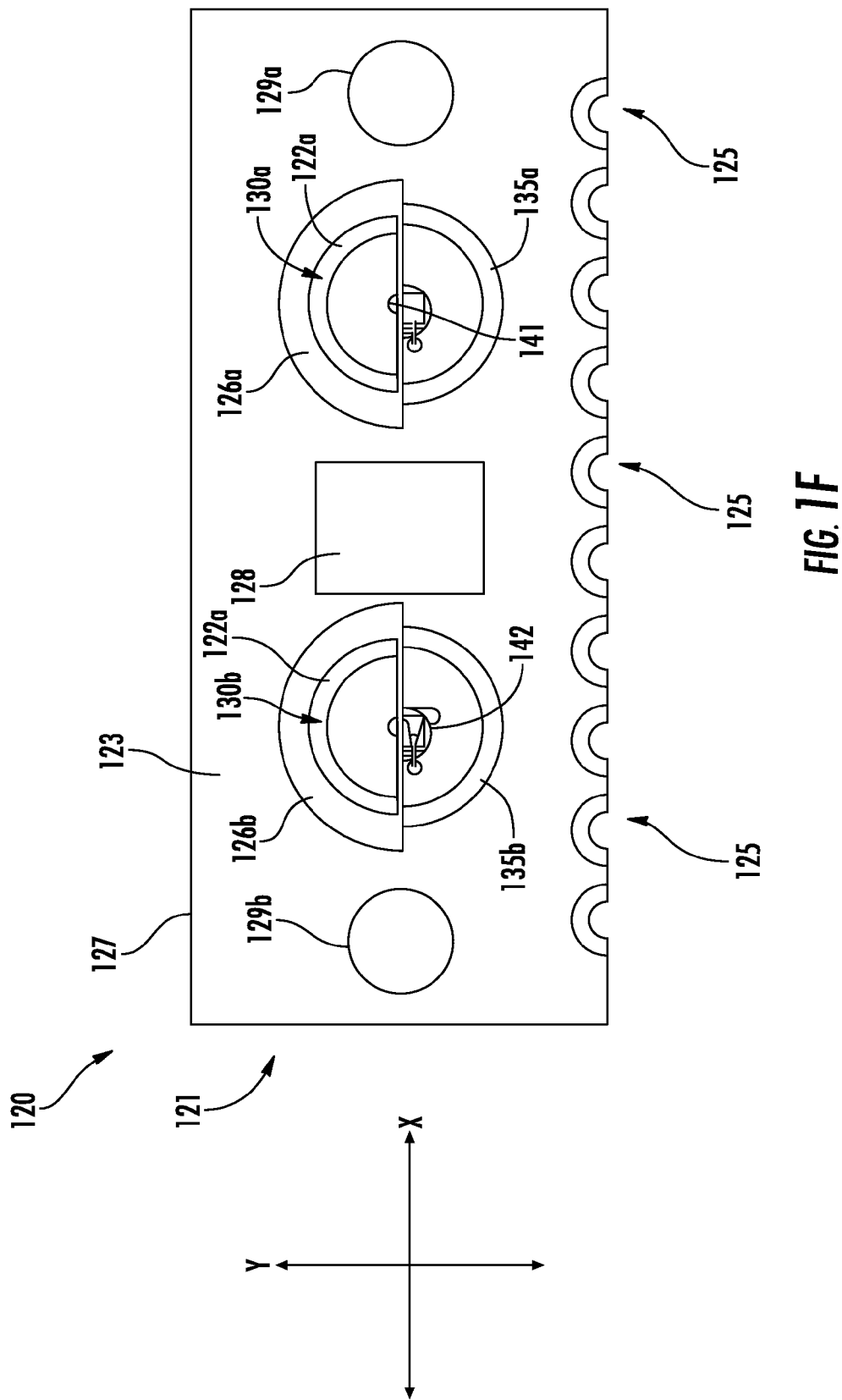
FIG. 1F schematically depicts a top view of the optical component assembly depicted in FIG. 1C according to one or more embodiments shown and described herein.
Figure 1G:
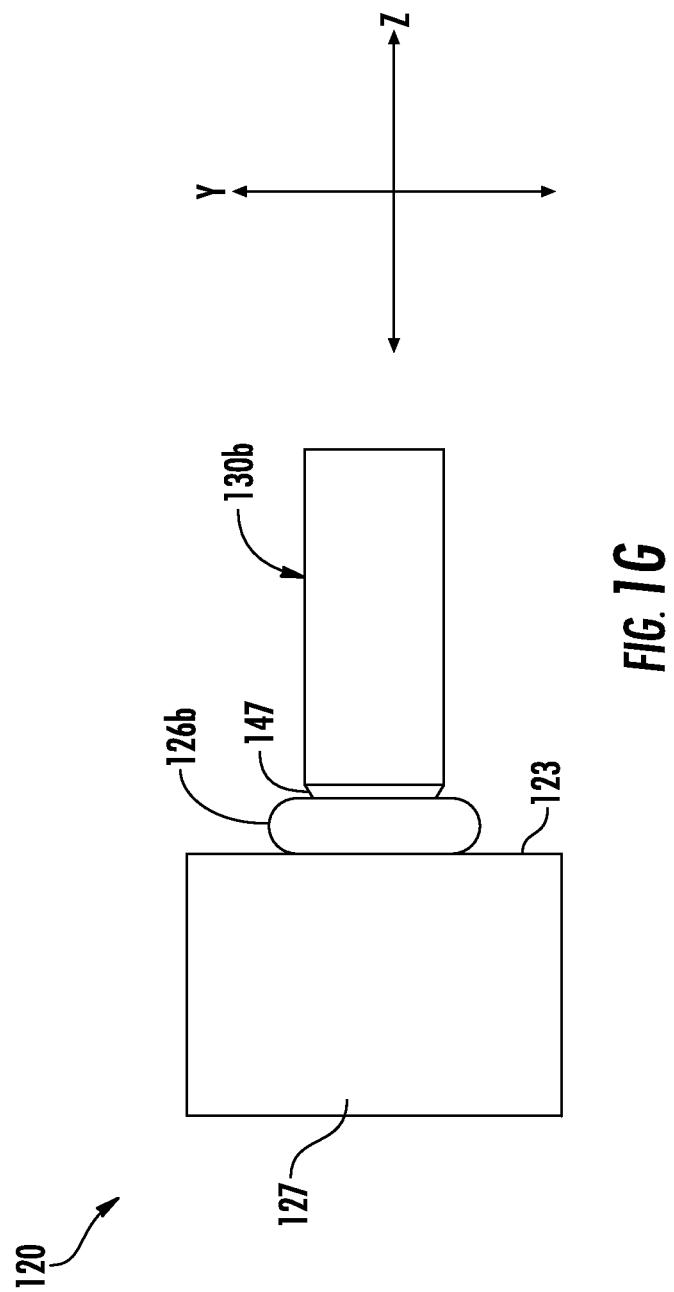
FIG. 1G schematically depicts a side view of the optical component assembly depicted in FIG. 1C according to one or more embodiments shown and described herein.

Referring now to FIG. 1C-1G, an optical component assembly 120 according to the embodiment illustrated in FIG. 1A is depicted in greater detail. Referring specifically to FIG. 1C, the optical component assembly 120 generally comprises an active component assembly 121 and a fiber securing assembly 122a/122b. FIGS. 1D-1F depict the fiber securing assembly 122a/122b in cross section to depict interior components of the active component assembly 121. The active component assembly 121 comprises an active component substrate 127, one or more integrated circuits 128 (or other electronic components), and two active optical components in the form of a light emitting component 141 (e.g., a laser diode, such as a VECSEL laser diode) and a light receiving component 142 (e.g., a photo detector operable to detect optical signals emitted by a corresponding light emitting component). The light emitting component 141 and the light receiving component 142 are coupled to a surface 123 within a first solder ring 126a and a second solder ring 126b, respectively, of the active component substrate 127. In alternative embodiments, the active component assembly 121 may have more or fewer active optical components (e.g., only a light emitting component, only a light transmitting component, several pairs of light emitting and light transmitting devices, etc.). For the embodiments described herein, active component substrate assemblies that have both a light emitting component and a light receiving component may be referred to as a transceiver substrate assembly having a transceiver substrate, and the overall assembly may be referred to as an optical transceiver assembly. Embodiments may have only one active optical component, as well a plurality of active optical components depending on the application of the optical component/transceiver assembly.

The active component substrate 127 may be made of a dielectric material, such as a printed circuit board material (e.g., FR-4), and may be electrically coupled to the mother printed circuit board 113 by electrically conductive castellations 125. The electrically conductive castellations 125 may take on a variety of configurations to enable the active component assembly 121 to be electrically coupled to the mother printed circuit board 113 (e.g., by pressure sensitive anisotropic conductive film or conventional solder reflow methods). In one embodiment, through-holes 129a and 129b may be provided through a thickness of the active component substrate 127, such as for mounting purposes.

Referring to FIG. 1D, the active component substrate 127 may include a first solder ring bond pad 135a and a second solder ring bond pad 135b. The light emitting component 141 may be coupled to a light emitting component bond pad (not shown) within the first solder ring bond pad 135a, and the light receiving component 142 may be coupled to a light receiving component bond pad (not shown) within the second solder ring bond pad 135b. The light emitting component pond pad is precisely aligned with the first solder ring bond pad 135a in the x- and y-axis directions, and the light receiving component bond pad is precisely aligned with the second solder ring pond pad 135b by the use of a single mask when fabricating the active component substrate 127. The first and second solder rings 126a and 126b are created by application of a solder material with a known surface tension to the first and second solder ring bond pads 135a, 135b (or another material with a known surface tension, such as an epoxy material). The surface tension of the solder material (e.g., C4 solder) may provide for a solder ring having a known height in the z-axis direction. As described below, the first and second solder rings 126a and 126b may provide an alignment component that allows for precise positioning of the fiber securing devices 122a/122b in the x-, y- and z-axis directions. It is noted that, due to the known surface tension of the solder, the solder rings are self-assembling structures that allow for the precise alignment of an end of an optical fiber to the active optical component.

In the embodiment illustrated in FIGS. 1A-1G, the optical component assembly 120 comprises a first fiber securing device 122a and a second fiber securing device 122b. More or fewer fiber securing devices may be utilized depending on the number of active components utilized in the optical component assembly. The first and second fiber securing devices 122a, 122b are configured to receive and secure an optical fiber, such as optical fibers 156a and 156b (FIG. 1E). The first and second fiber securing devices 122a, 122b may be configured as a ferrule having a first fiber installation feature 130a and a second fiber installation feature 130b, respectively, fully extending therethrough. The first and second fiber installation features 130a, 130b comprise a fiber insertion region 131a/131b, a close-fitting region 132a/132b, and a fiber end region 133a/133b. The fiber insertion region 131a/131b may be frusto-conical in shape to aid in guiding the optical fiber 156a/156b into the first and second fiber securing devices 122a, 122b. The close-fitting regions 132a/132b may have a diameter that is substantially similar to that of an outside diameter of the optical fibers 156a/156/b such that the optical fibers are maintained within the close-fitting regions without substantial freedom of movement. The fiber end region 133a/133b of the first and second fiber installation features 130a, 130b is an opening at a signal surface 137a/137b of the first and second fiber securing devices 122a, 122b such that the fiber end regions 133a, 133b act as a first signal aperture and a second signal aperture.

The first and second fiber securing devices 122a, 122b each comprise an engagement surface 134a/134b at an engagement end that tangentially contacts the first and second solder rings 126a, 126b when positioned within the first and second solder rings 126a, 126b, respectively. The engagement surface 134a/134b may be configured as a chamfer, as illustrated in FIGS. 1C-1E, 1G, or other engagement shapes that aid in locating the x-y-z position of the optical fiber 156a, 156b.

In an alternative embodiment, the optical component assembly 120 may have only a single fiber securing device rather than the two first and second fiber securing devices 122a and 122b. In this embodiment, the first and second fiber securing devices may be coupled together as a single component having a first extension and a second extension. For example the first fiber installation feature 130a may extend through the first extension, and the second fiber installation feature 130b may extend through the second extension, as described above with respect to the first and second fiber securing devices 122a, 122b. However, in this embodiment, the first and second fiber securing devices 122a and 122b are connected together as a unitary component.

In one embodiment, an optical fiber (e.g., first optical fiber 156a) is inserted into the first fiber installation feature 130a or the second fiber installation feature 130b by pushing an end of the optical fiber into the fiber insertion region 131a, through the close-fitting region 132a and up against the fiber end region 133a. The end of the optical fiber should be referenced to the signal surface 137a/137b of the fiber securing device. In one embodiment, a temporary stop is placed against the signal surface 137a/137b such that the ends of the first and second optical fibers 156a, 156b abut the temporary stop and do not extend past the signal surface 137a/137b of the first and second fiber securing devices 122a, 122b (i.e., the ends of the first and second optical fibers 156a, 156b are located at the fiber end regions 133a, 133b). The first and second optical fibers 156a, 156b may be bonded within the first and second fiber securing devices 122a, 122b by use of an adhesive. In another embodiment, the first and second optical fibers 156a, 156b, may be inserted through the fiber installation features 130a/130b of the first and second fiber securing devices 122a, 122b such that the ends of the first and second optical fibers 156a, 156b extend past the fiber end regions 133a/133b. The first and second optical fibers 156a, 156b may then be cleaved (e.g., by a laser) such that the ends of the first and second optical fibers 156a, 156b are either flush with the fiber end regions 133a/133b, or are at a known, specified distance from the fiber end regions 133a/133b The ends of the first and second optical fibers 156a, 156b should be substantially referenced to the fiber end regions 133a/133b such that they are at a known z-axis distance d from the surface 123 of the active component substrate 127 (i.e., a known predetermined height measured from the fiber end region 133a/133b to the surface 123 of the active component substrate 127). In one embodiment, the ends of the optical fibers 156a, 156b are located substantially 50 μm from the fiber end regions 133a/133b.

Referring specifically now to FIG. 1E, the first optical fiber 156a and the first fiber securing device 122a and the second optical fiber 156b and the second fiber securing device 122b are coupled to the active component assembly 121 such that the engagement surfaces 134a/134b tangentially contact the first and second solder rings 126a, 126b, respectively. The first and second fiber securing device 122a, 122b, may be secured to the first and second solder rings 126a, 126b by an index of refraction matching material that is substantially transparent to the optical radiation emitted and received by the light emitting component 141 and the light receiving component 142, respectively such that the optical signals emitted by the light emitting component 141 may enter the optical fiber and the optical signals propagating in the optical fiber may be received by the light receiving component 142 (e.g., an epoxy or other adhesive).

The first and second solder rings 126a and 126b act as alignment components that precisely align the first and second fiber securing devices 122a and 122b to a predetermined spatial optical coupling location of the active component substrate 127 (e.g., a predetermined light emitting location with respect to the light emitting component 141 and a predetermined light receiving location with respect to the light receiving component 142). As described above, the light emitting component 141 and the light receiving component 142 are precisely aligned with the first and second solder rings 126a, 126b, respectively, in the x- and y-axis directions by use of a single solder mask. Because of the known height of the first and second solder rings 126a, 126b (i.e., by the known surface tension and amount of solder used to form the rings) as well as x and y position of the first and second solder rings 126a and 126b, the fiber end region 133a/133b of the first and second fiber securing devices 122a, 122b and the corresponding ends of the first and second optical fibers 156a, 156b are substantially aligned in a specific spatial position relative to the top surface of the light emitting component 141 and the light receiving component 142, respectively, in x-, y-, and z-axis directions.

The signal surfaces 137a/137b of the first and second fiber securing devices 122a, 122b are located at a known predetermined distance d (height) along the z-axis measured from the signal surfaces 137a/137b to the surface 123 of the active component substrate 127. The predetermined distance d is determined by the height and shape of the first and second solder rings 126a, 126b. The shape and location of the first and second solder rings 126a, 126b also positions the fiber end regions 133a/133b at a known x and y position with respect to the active component substrate 127. In this manner, the fiber end region of a fiber securing device may be substantially located at a predetermined optical coupling location with respect to an active optical component, such as a light emitting component or a light receiving component. Accordingly, the fiber securing devices and solder rings may substantially align an end of an optical fiber with an active component for optical signal transmission.

As illustrated in FIG. 1A, the optical component assembly 120 may be coupled to the mother printed circuit board 113 such that the active components of the active component substrate are electrically coupled to the components of the mother printed circuit board 113.

Figure 2A:
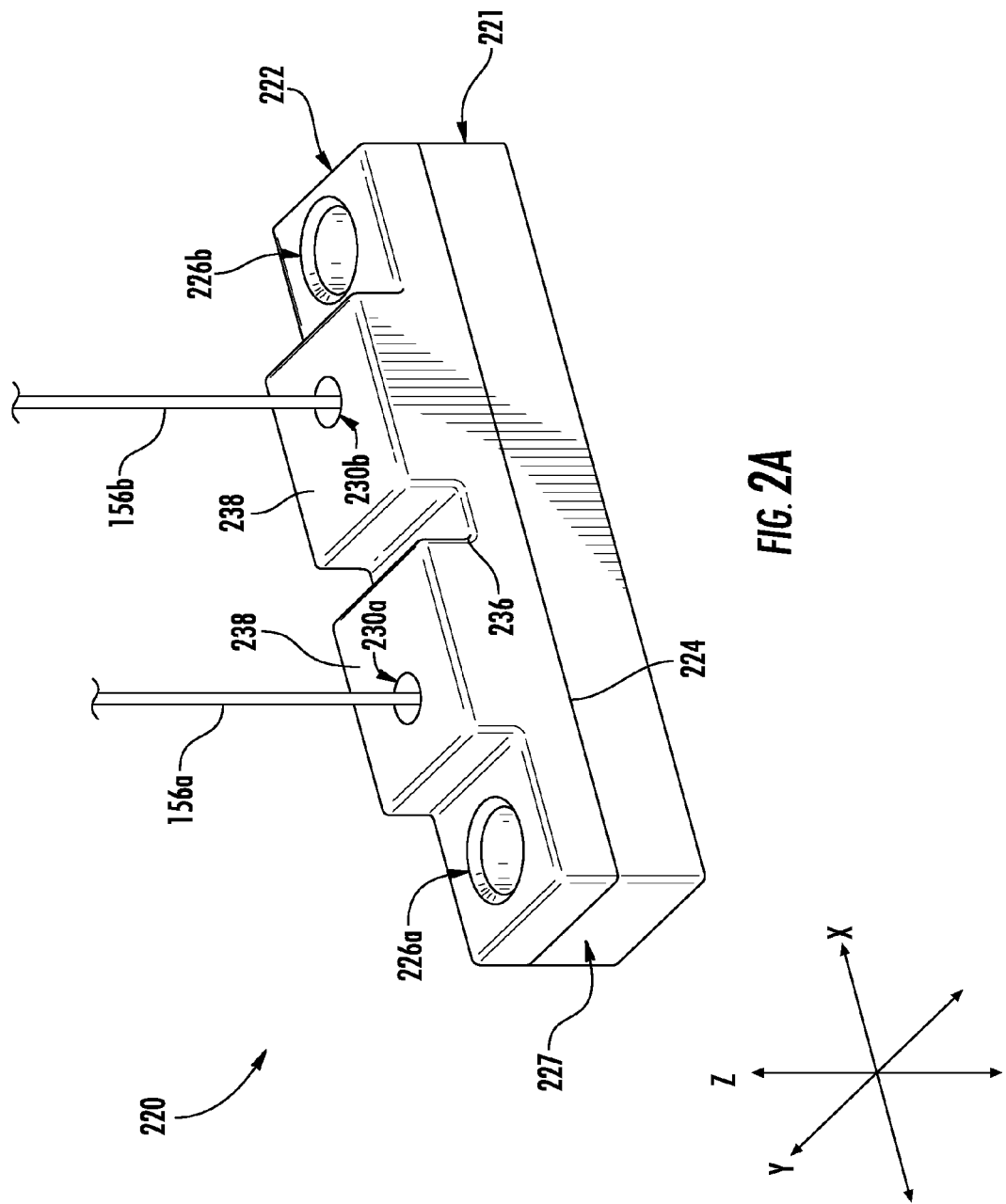
FIG. 2A schematically depicts a top perspective view of an optical component assembly having a single fiber securing device according to one or more embodiments shown and described herein.
Figure 2B:
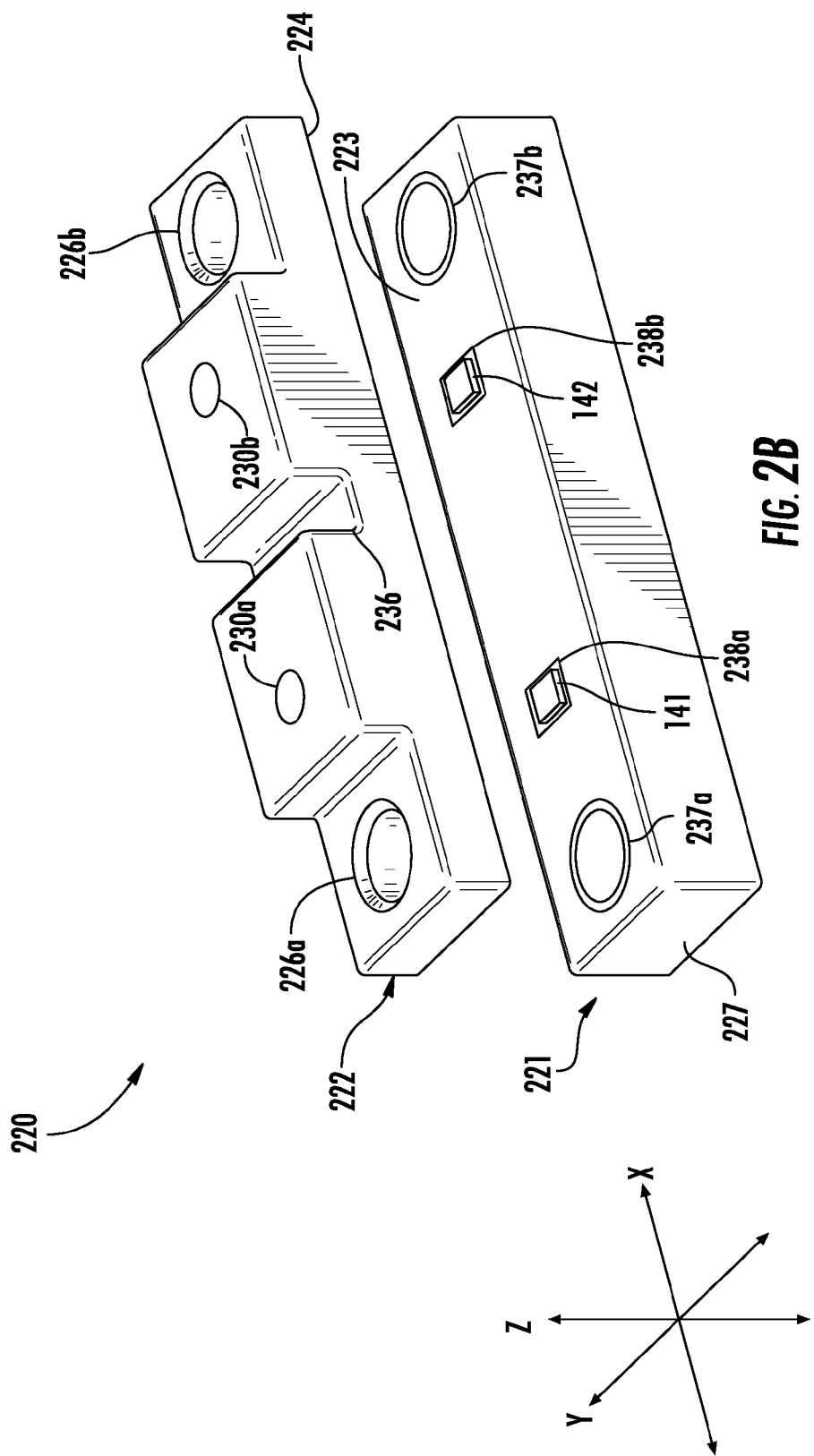
FIG. 2B schematically depicts a partially exploded, top perspective view of the optical component assembly depicted in FIG. 2A according to one or more embodiments shown and described herein.

Referring now to FIGS. 2A-2E, another embodiment of an optical component assembly 220 is illustrated. The optical component assembly 220 generally comprises a fiber securing assembly configured as a single optically transparent fiber securing device 222, and an active component assembly 221. Referring specifically to FIG. 2B, the active component assembly 221 comprises an active component substrate 227 having a light emitting component 141 and a light receiving component 142 coupled thereto at a light emitting component location and a light receiving component location defined by pads 238a and 238b, respectively. More or fewer active optical components may be provided. Optical component assemblies having both a light emitting component and a light receiving component may be referred to as optical transceiver assemblies, and the active component assembly 221 as a transceiver substrate assembly. As described above with respect to the embodiment illustrated in FIGS. 1A-1G, the active component substrate 227 may be made from a dielectric material, such as FR-4, for example.

The active component substrate 227 of the embodiment illustrated in FIGS. 2A-2E may comprise a first alignment location 237a and a second alignment location 237b. As described in detail below, the first and second alignment locations 237a and 237b may assist in precisely aligning the fiber securing device 222 and the active optical components to the active component substrate 227 by the use of a vision system (not shown). The first and second alignment locations 237a and 237b may be configured as reference marks that are printed on a surface 223 of the active component substrate 227 at precise x- and y-axis coordinates, respectively. The light emitting component 141 and the light receiving component 142 may be coupled to the surface 223 of the active component substrate 227 by a vision die-attach system that uses the first alignment location 237a and the second alignment location 237b as reference points. First and second pads 238a and 238b may be lithographically defined at the same time as the first and second alignment locations 237a and 237b. In one embodiment, the active components may be directly aligned to their respective pads 238a, 238b. The active component substrate 227 may further include electrical connection vias to electrically couple the active component substrate 227 and the active optical components to the mother printed circuit board 113 (see FIG. 1A).

The fiber securing device 222 may comprise a first fiber installation feature 230a, a second fiber installation feature 230b, a first alignment aperture 226a and a second alignment aperture 226b. The material chosen for the fiber securing device 222 should be substantially transparent to the wavelength(s) of the optical radiation emitted and received by the light emitting component 141 and the light receiving component 142 such that the optical radiation may pass through the fiber securing device 222. Exemplary materials may include, by way of example and not limitation, epoxy resins, polyurethanes, polycarbonates, and polyetherimides.

It is noted that the fiber securing device 222 illustrated in FIGS. 2A-2E is configured to optically couple two optical fibers 156a and 156b to two active optical components (e.g., the light emitting component 141 and the light receiving component 142). However, it is should be understood that embodiments may be configured to optically couple more or fewer optical fibers to more or fewer active components.

Figure 2C:
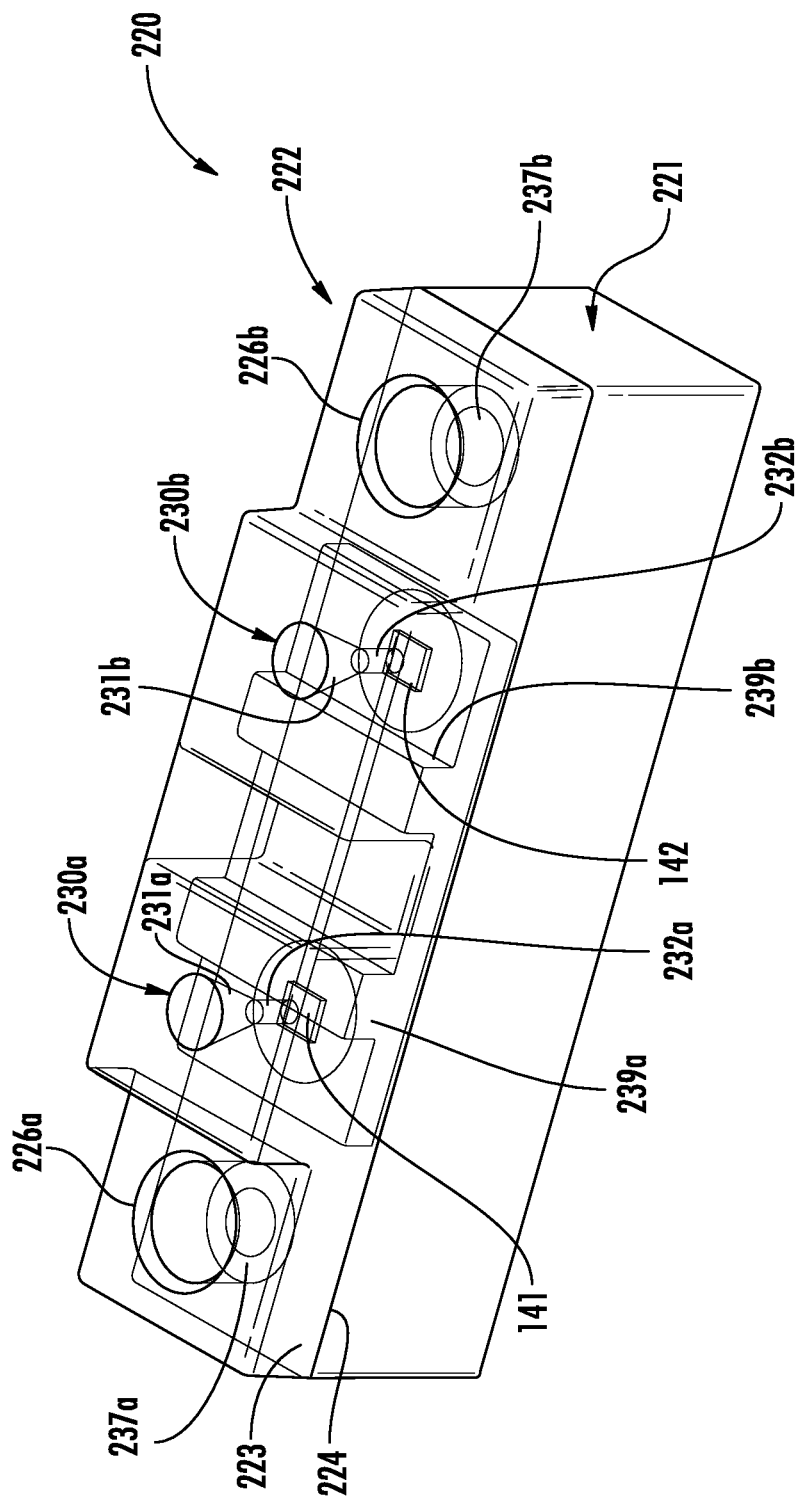
FIG. 2C schematically depicts a transparent, top perspective view of the optical component assembly depicted in FIG. 2A according to one or more embodiments shown and described herein.
Figure 2E:
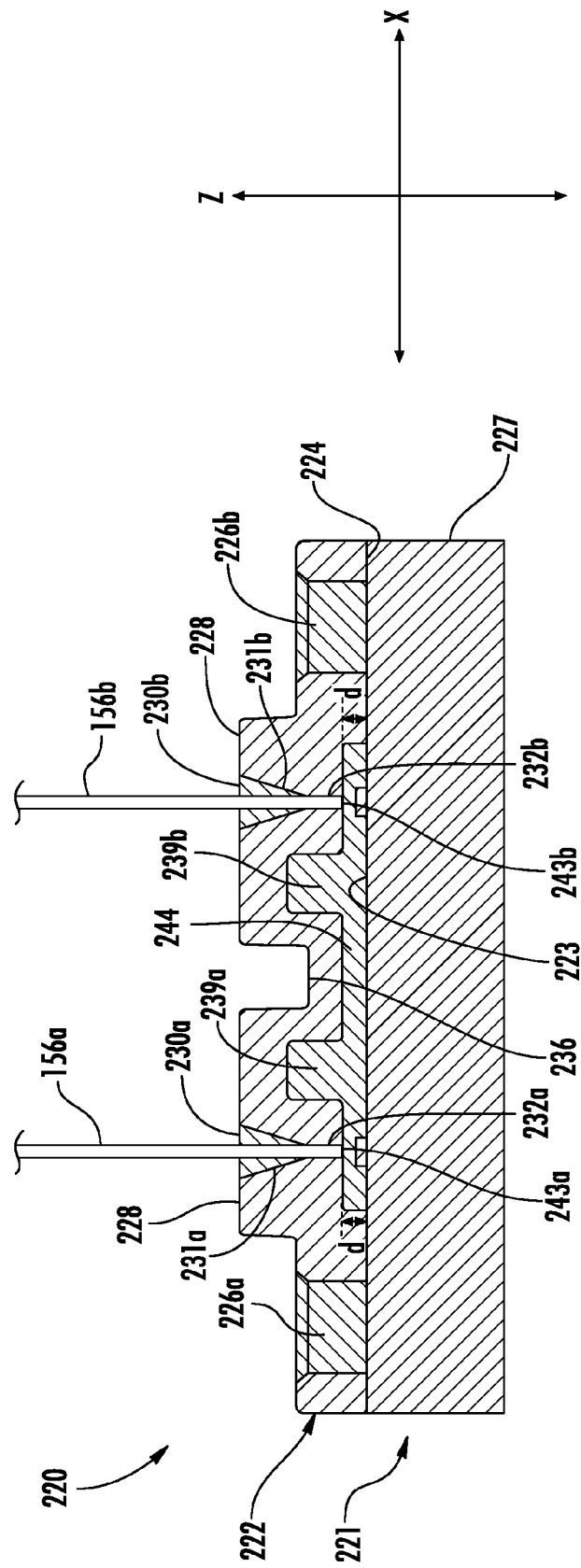
FIG. 2E schematically depicts a cross-sectional view of the optical component assembly depicted in FIG. 2A according to one or more embodiments shown and described herein.

Referring specifically now to FIGS. 2C and 2E, the first and second fiber installation features 230a and 230b are illustrated. FIG. 2C illustrates the optical component assembly 220 showing the interior first and second fiber installation features 230a and 230b, while FIG. 2E provides a cross-sectional view of the optical component assembly 220. Each of the first and second fiber installation features 230a and 230b may comprise a fiber insertion region 231a/231b, a close-fitting region 232a/232b, and a fiber end region 243a/243b within a bulk of the fiber securing device 222 material. The fiber insertion region 231a/231b may comprise an opening at a fiber installation surface 228, and may be frustoconical in shape to ease insertion of the first and second optical fibers 156a and 156b into the first and second fiber installation features 230a and 230b.

The close-fitting region 232a/232b may be configured as a hole having an end surface (i.e., a stop) that defines the fiber end region 243a/243b. Therefore, the fiber end region 243a/243b of the embodiments illustrated in FIGS. 2A-2E is located within a bulk region of the fiber securing device 222. A diameter of the close-fitting region 232a/232b may closely match the outer diameter of the first and second optical fibers 156a and 156b.

Referring specifically to FIG. 2E, the end surface of the blind hole defining the fiber end region 243a/243b is located at a predetermined distance d (height) along the z-axis measured from the fiber end region 243a/243b to the surface 223 of the active component substrate 227. The predetermined distance d is determined by the depth of the blind hole of the close-fitting region 232a/232b. As described below, the predetermined distance d sets the z-axis distance from of an end of the fiber optic cable to the active optical component. The location of the first and second fiber installation features 230a and 230b sets the x- and y-axis location of the fiber ends.

The first optical fiber 156a may be inserted into the first fiber installation feature 230a such that an end of the first optical fiber 156a abuts the fiber end region 243a. The second optical fiber 156b may be inserted into the second fiber installation feature 230b such that an end of the second optical fiber 156b abuts the fiber end region 243b. The first and second optical fibers 156a and 156b may then be secured within the first and second fiber installation features 230a and 230b by an index-matching, transparent material (e.g., an index-matching epoxy material). In one embodiment, a small vent hole (not shown) may extend from the fiber end region 243a/243b to an attachment surface 224 to expose the first and second fiber installation features 230a, 230b to ambient at the bottom of the fiber securing device 222 such that excess air may escape upon insertion of the optical fiber and the epoxy material.

Referring to both FIGS. 2C and 2E, the fiber securing device 222 may further comprise an active optical component recess 244 in an attachment surface 224 such that the light emitting component 141 and the light receiving component 142 may be positioned within the active optical component recess 244 when the fiber securing device 222 is coupled to the active component substrate 227. The active optical component recess 244 may have a configuration other than the configuration depicted in FIGS. 2C and 2E. For example, the active optical component recess may be configured as two recesses, with one recess for the light emitting component 141 and one recess for the light receiving component 142.

The first alignment aperture 226a is located at a first end of the fiber securing device 222 and the second alignment aperture 226b is located at an opposite, second end of the fiber securing device 222. The x- and y-axis coordinates of the first alignment aperture 226a and the second alignment aperture 226b may be held in tight tolerance of one another for precise alignment with the first and second alignment location 237a, 237b of the active component substrate 227. Embodiments are not limited to the particular location of the first and second alignment apertures 226a and 226b. Further, more than two alignment apertures may be utilized in other embodiments.

The fiber securing device 222 may be aligned with, and positioned on, the surface 223 of the active component substrate 227 by an automated process that utilizes vision alignment. During vision-system assembly of the fiber securing device 222 to the surface 223 of the active component substrate 227, the first and second alignment apertures 226a and 226b are positioned in the x- and y-axis directions to align with the first and second alignment locations 237a and 237b, respectively. In this manner, the first and second alignment apertures 226a and 226b and the first and second alignment locations 237a and 237b act as alignment components that align the fiber securing device 222 to the active component substrate 227. Therefore, the fiber securing device 222, the light emitting component 141, and the light receiving component 142 are coupled to the surface 223 of the active component substrate 227 using the same first and second alignment locations 237a, 237b as reference points. An attachment surface of the fiber securing device 222 that contacts the surface 223 of the active component substrate 227 may be secured by an adhesive, such as epoxy.

The fiber securing device 222 aligns fiber ends of the first and second optical fibers 156a and 156b to predetermined optical coupling locations in x-, y-, and z-axis directions relative to the respective active optical component (e.g., the light emitting component 141 and the light receiving component 142). A predetermined optical coupling location is the location that provides the greatest optical coupling between the end of the optical fiber and the active component. The fiber end should be aligned in both left and right directions, as well as in height for optimum optical coupling.

As described above, the location of the end surface of the hole 232a/232b (i.e., the fiber end region 243a/243b) establishes a known z-axis position of the end of the optical fibers with respect to the surface 223 of the active component substrate 227. The x- and y-axis coordinates are established by the alignment of the first and second alignment apertures 226a and 226b with the first and second alignment locations 237a and 237b. In this manner, the fiber end region(s) of the fiber securing device may be substantially located at a predetermined optical coupling location with respect to an active optical component, such as a light emitting component or a light receiving component. Accordingly, the fiber securing device and the alignment locations on the active component substrate may substantially align an end of an optical fiber with an active component for optical signal transmission.

In some embodiments, the fiber securing device 222 may further comprise one or more notches to reduce and/or prevent optical cross-talk between the emitted and received optical signals. The embodiment depicted in FIGS. 2A-2E comprises a first notch 236 on a top of the fiber installation surface 228. The first notch 236 is positioned between the first and second fiber installation features 230a and 230b to prevent optical cross talk between optical signals propagating in the first and second optical fibers 156a and 156b. The illustrated embodiment further comprises a second notch 239a and the third notch 239b on a bottom or attachment surface 224 of the fiber securing device 222. The second notch 239a may extend from the active optical component recess 244 and be positioned between the first fiber installation feature 230a and the first notch 236. The third notch 239b may extend from the active optical component recess 244 and be positioned between the first notch 236 and the second fiber installation feature 230b.

Figure 3A:
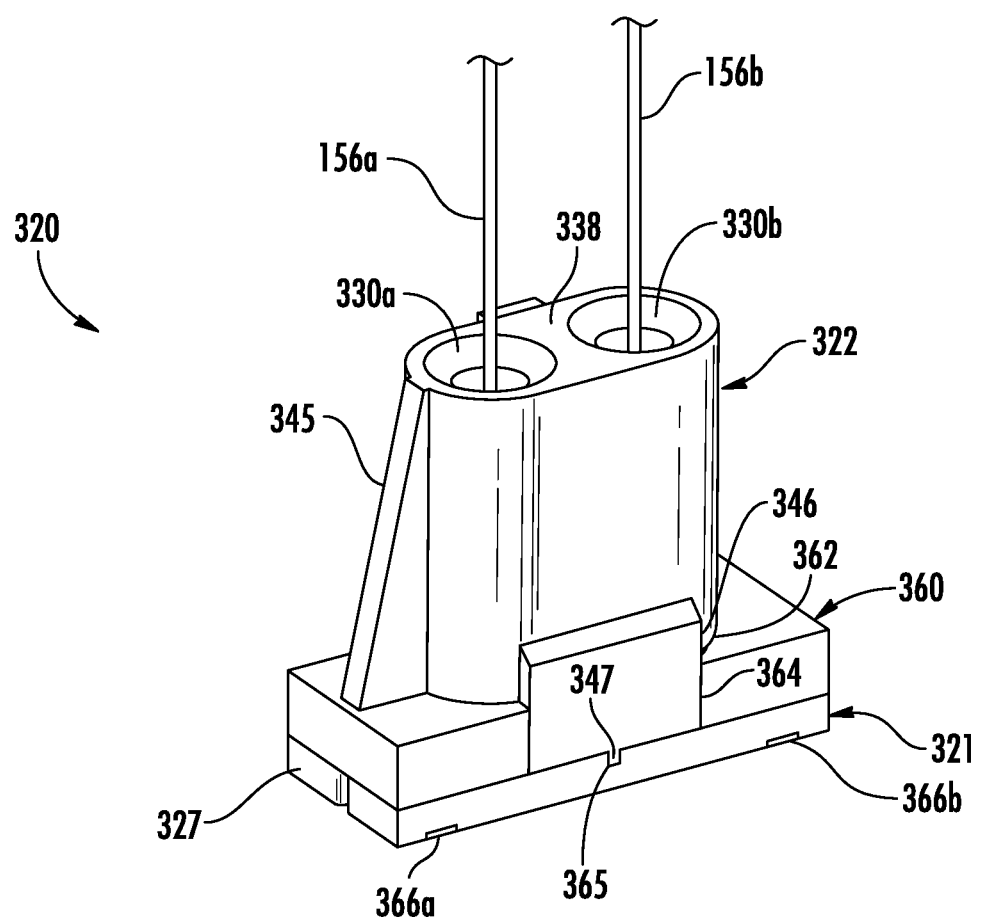
FIG. 3A schematically depicts a front, top perspective view of an optical component assembly having a fiber securing device and a collar according to one or more embodiments shown and described herein.
Figure 3B:
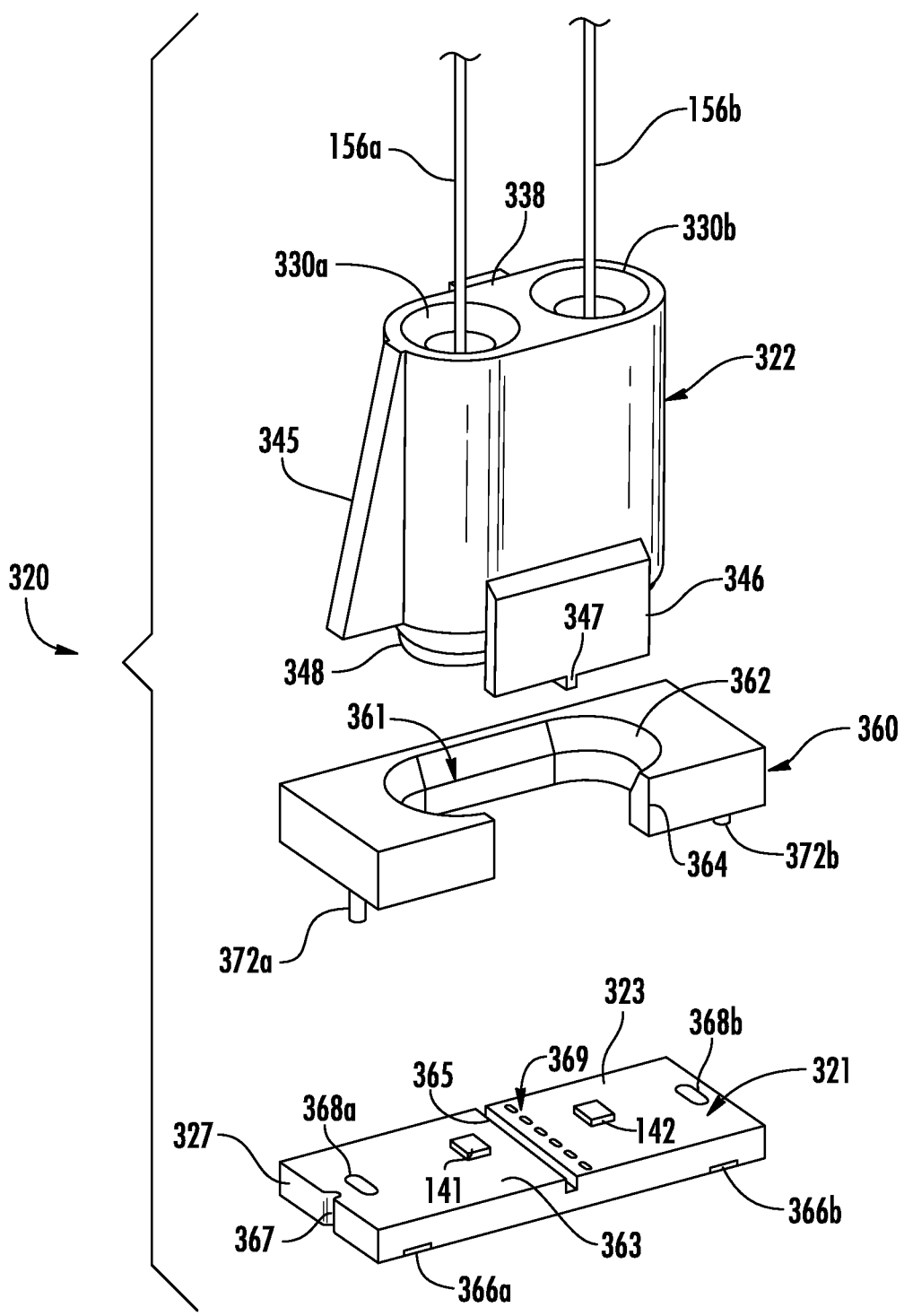
FIG. 3B schematically depicts a partially exploded, top perspective view of the optical component assembly depicted in FIG. 3A according to one or more embodiments shown and described herein.

Referring now to FIGS. 3A-3G, another embodiment of an optical component assembly 320 is illustrated. The optical component assembly 320 generally comprises a two-component fiber securing assembly configured as a fiber securing device 322 and a collar 360, and an active component assembly 321. Referring specifically to FIG. 3B, the active component assembly 321 comprises an active component substrate 327 having a light emitting component 141 and a light receiving component 142 coupled thereto at a light emitting component location and a light receiving component location, respectively. More or fewer active optical components may be provided. Optical component assemblies having both a light emitting component and a light receiving component may be referred to as optical transceiver assemblies, and the active component assembly 321 a transceiver substrate assembly. The active component substrate 327 may be made from a dielectric material, such as FR-4, for example.

A surface 323 of the active component substrate 327 may include a slot 365 into which a light baffle 347 (described below) of the fiber securing device 322 may be positioned during mechanical engagement of the fiber securing device 322 and the active component substrate 327. The active component substrate 327 may also include pin holes 368a and 368b to enable mechanical engagement and alignment of the fiber securing device 322 to the active component substrate 327. Additionally, electrically conductive vias 369 may extend through the thickness of the active component substrate 327 that form a Faraday cage to electrically isolate the active components of the active component assembly 321. It is noted that electrically conductive vias 369 may be utilized in any embodiment of the active component substrate 327 illustrated in the appended figures, and not only the two-component fiber securing assembly embodiment illustrated in FIGS. 3A-3G.

In some embodiments, the active component substrate 327 may further comprise a mechanical key notch 367 such that the optical component assembly 320 may be coupled to the mother printed circuit board 113 in only one correct orientation. Conductive pads 366a and 366b may be provided to couple the active component substrate 327 of the optical component assembly 320 to the mother printed circuit board 113 (see FIG. 3F, which illustrates a bottom view of the active component substrate 327).

As illustrated in FIGS. 3A-3G, the collar 360 is mechanically coupled to the active component substrate 327 and aligns the fiber securing device 322 to the proper location with respect to the active component assembly 321 to thereby align the ends of the first and second optical fibers 156a and 156b with the light emitting component 141 and the light receiving component 142, respectively. In one embodiment, the collar 360 comprises an inner wall 362 that is non-continuous and is generally "C" shaped. The inner wall 362 may define a collar gap 364, which is the opened area of the "C" shape. The collar gap 364 exposes a region of an edge 370 of the active component substrate 327. In another embodiment, the inner wall 362 may be continuous such that no opened area is formed.

The inner wall 362 of the collar 360 may have a conical, oval shape that is configured to mate with a corresponding conical, oval-shaped engagement surface 348 of the fiber securing device 322. Other engagement surface configurations are also possible. As shown in FIG. 3B, the collar 360 may comprise coupling pins 372a and 372b that are positioned and configured to be inserted into the pin holes 368a and 368b of the active component substrate 327. The collar 360 may be mechanically coupled to the active component substrate 327 by insertion of the coupling pins 372a and 372b into the pin holes 368a and 368b. The coupling pins 372a and 372b may be staked (e.g., by the application of heat or ultrasonic energy) to permanently attach the collar 360 to the active component substrate 327.

Figure 3C:
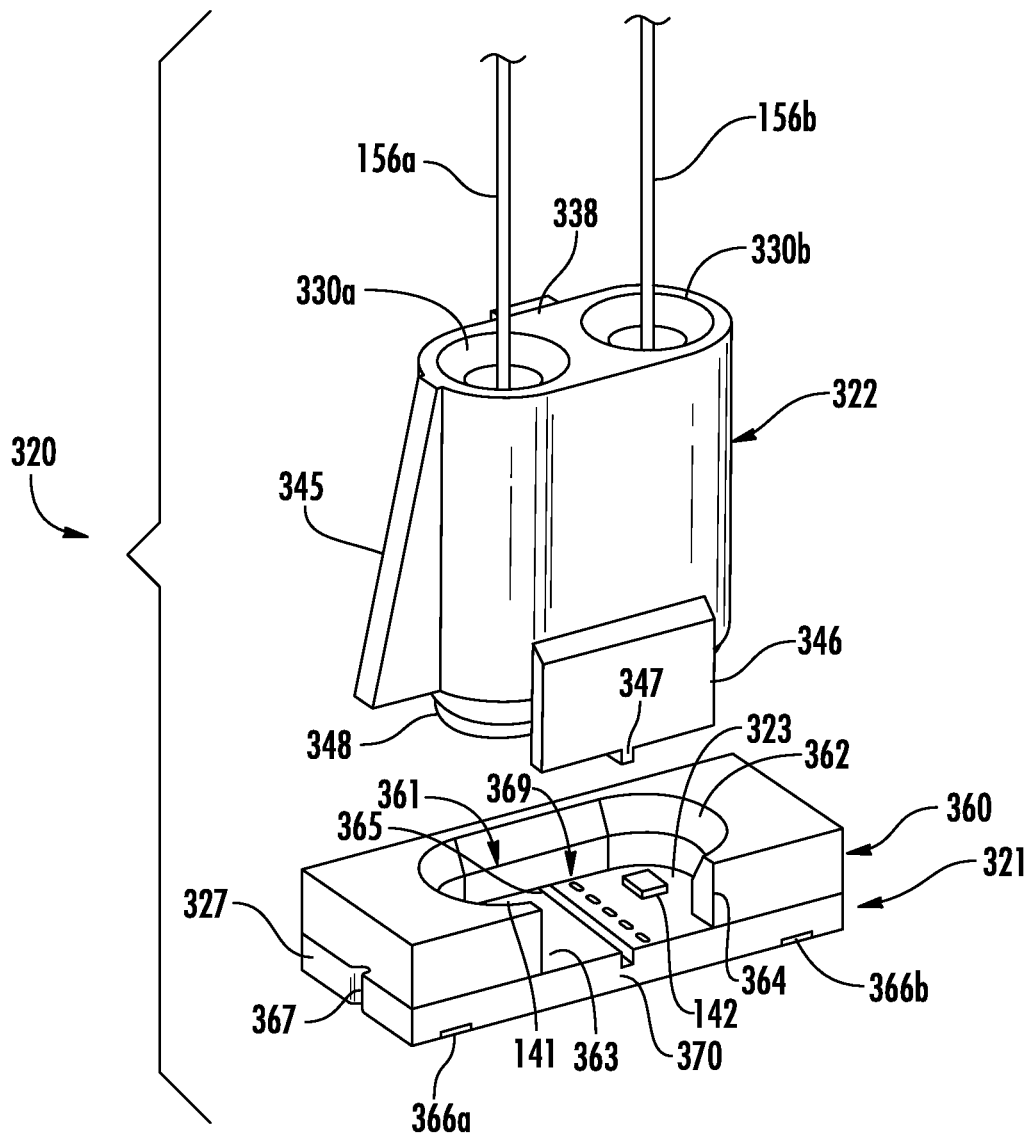
FIG. 3C schematically depicts a partially exploded, top perspective view of the optical component assembly depicted in FIG. 3A according to one or more embodiments shown and described herein.

Once attached to the active component substrate 327, the collar 360 defines a collar opening 361 that exposes a region 363 of the surface 323 of the active component substrate 327. As depicted in FIG. 3C, the light emitting component 141 and the light receiving component 142 are positioned on the region 363 of the active component substrate 327 exposed by the collar opening 361. In one embodiment, the collar 360 is coupled to the active component substrate 327 prior to populating the active component substrate 327 with the active optical components, such as the light emitting component 141 and the light receiving component 142. In this embodiment, a vision die-attach system is used to populate the active component substrate 327 that uses the exposed edge 370 of the active component substrate 327 and the inner wall 362 as a reference surfaces for the vision die-attach system. In embodiments that do not have a collar gap 364, the collar opening 361 may expose two edges of the active component substrate 327 such that the exposed two edges may be used as reference surfaces. In this manner, the light emitting component 141 and the light receiving component 142 may be accurately positioned on the active component substrate 327 with respect to the collar 360 independent from features or markings on the surface 323 of the active component substrate 327.

The fiber securing device 322, which is configured to mate with the collar 360 at the collar opening 361, may comprise a first fiber installation feature 330a, a second fiber installation feature 330b, a light baffle 347, and tabs 345 and 346. One or more additional fiber installation features (or fewer) may be provided depending on the number of active optical components in the assembly. The material chosen for the fiber securing device 322 should be substantially opaque to the wavelength(s) of the optical signals emitted by and received by the light emitting component 141 and the light receiving component 142. Exemplary materials may include, by way of example and not limitation, epoxy resins, polyurethanes, polycarbonates, and polyetherimides.

It is noted that the fiber securing device 322 illustrated in FIGS. 3A-3G is configured to optically couple two optical fibers 156a and 156b to two active components (e.g., the light emitting component 141 and the light receiving component 142). However, it is should be understood that embodiments may be configured to optically couple more or fewer optical fibers to more or fewer active optical components.

Figure 3D:
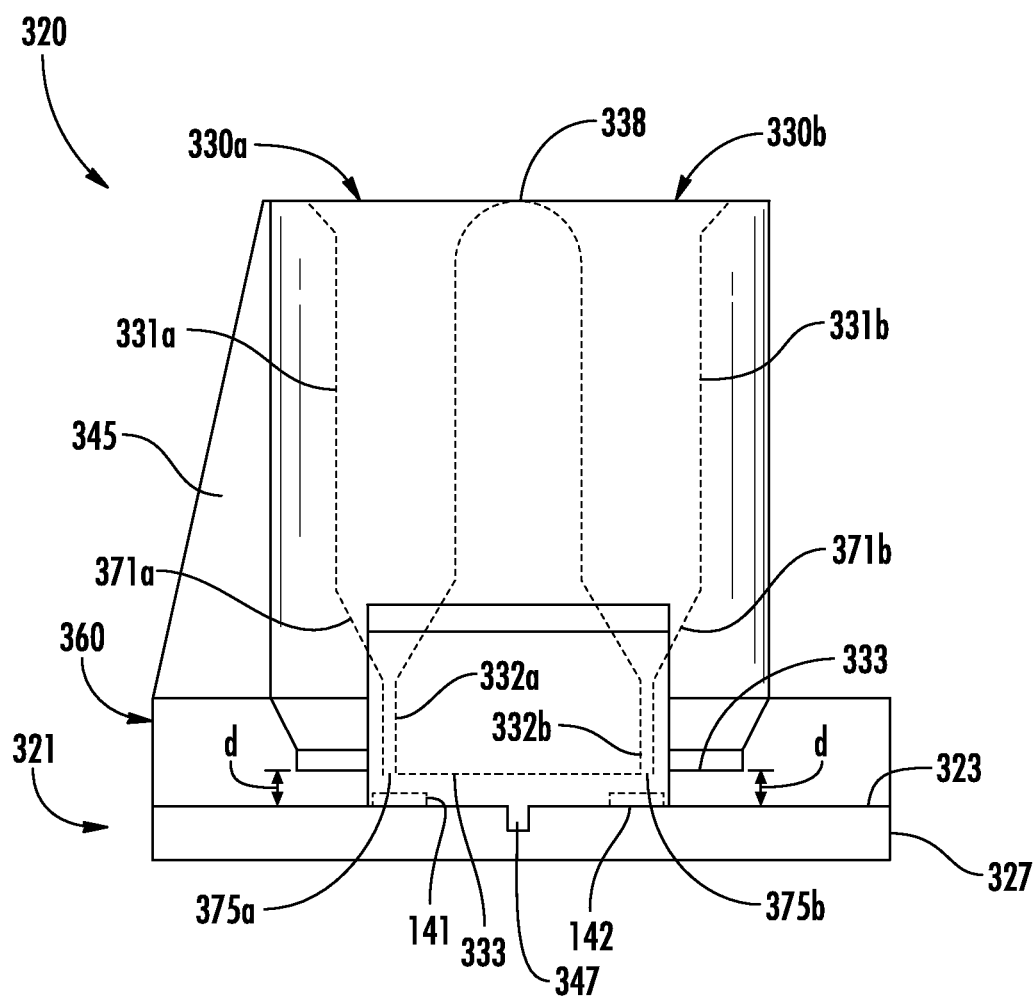
FIG. 3D schematically depicts a partially transparent view of the optical component assembly depicted in FIG. 3A according to one or more embodiments shown and described herein.
Figure 3E:
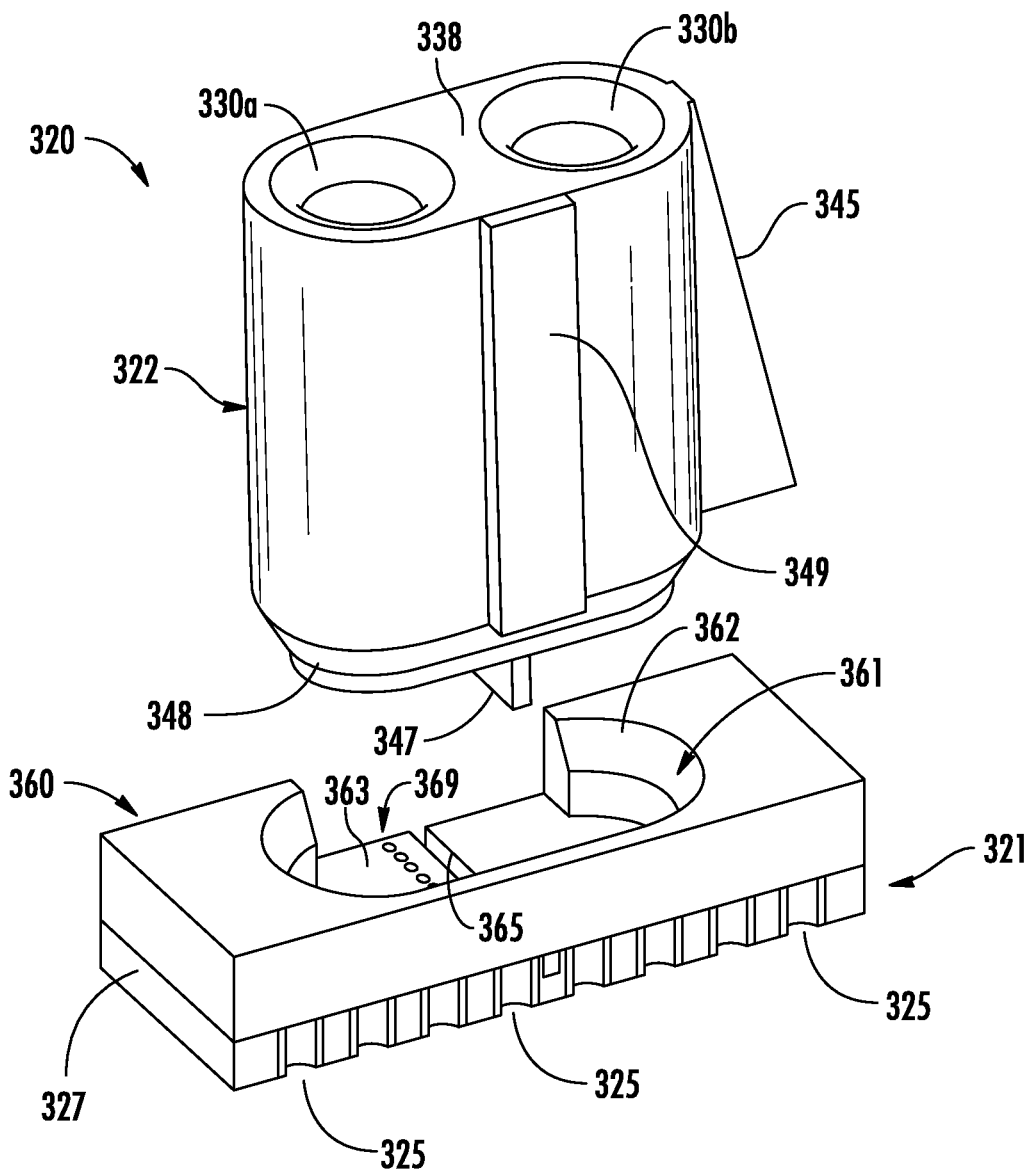
FIG. 3E schematically depicts a rear, top perspective view of the optical component assembly depicted in FIG. 3A according to one or more embodiments shown and described herein.
Figure 3G:
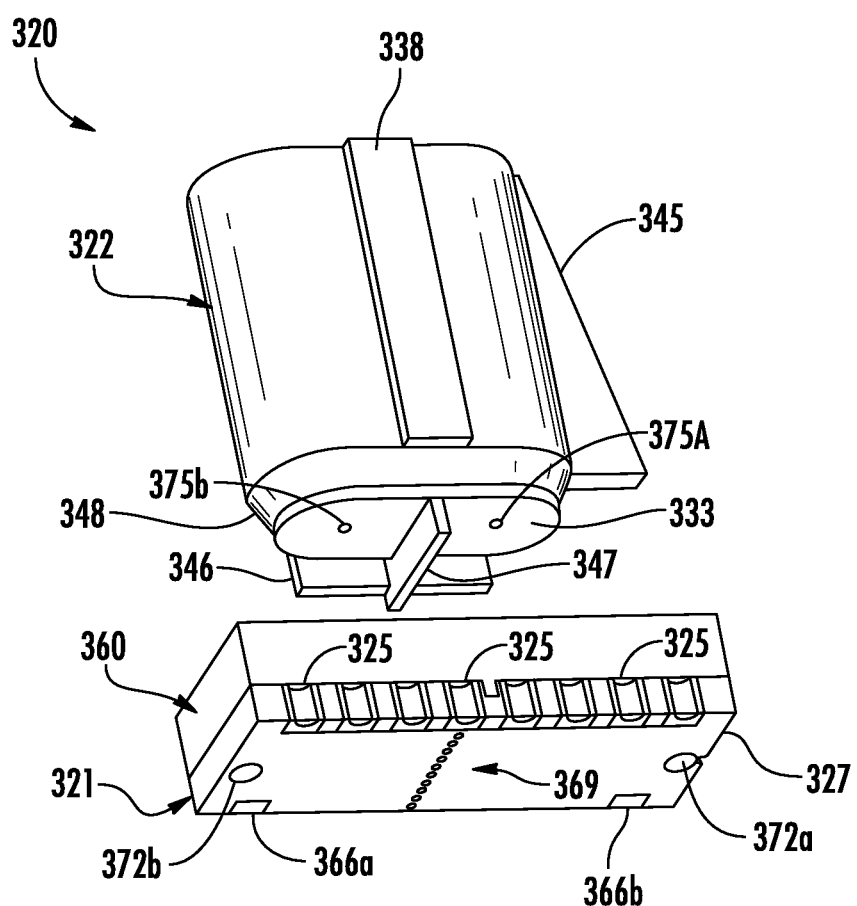
FIG. 3G schematically depicts a rear, bottom perspective view of the optical component assembly depicted in FIG. 3A according to one or more embodiments shown and described herein.

The first and second fiber installation features 330a and 330b fully extend through a bulk of the fiber securing device 322 from a fiber installation surface 338 to a signal surface 333 (see FIG. 3G). Referring specifically to FIGS. 3D and 3G, the first and second fiber installation features 330a and 330b may each comprise a fiber insertion region 331a/331b, a frusto-conical region 371a/371b, a close fitting region 332a/332b, and a fiber end region 375a/375b. The fiber insertion region 331a/331b may comprise an opening at the fiber insertion surface 368 that tapers to the close-fitting region 332a/332b via the frusto-conical region 371a/371b. The diameter of the fiber insertion region 331a/331b may be greater than an outer diameter of the first and second optical fibers 156a and 156b for ease of insertion of the optical fibers into the first and second fiber installation feature 330a and 330b. A diameter of the close-fitting region 332a/332b may closely match the outer diameter of the first and second optical fibers 156a and 156b. The fiber end regions 375a and 375b open to the signal surface 333 to form a first signal aperture and a second signal aperture (see FIG. 3G).

The first and second optical fibers 156a and 156b should be inserted into the first and second fiber installation features 330a and 330b, respectively, such that the ends of the first and second optical fibers 156a and 156b are positioned at the fiber end region 375a and 375b and are substantially referenced to the signal surface 333. As described above, the fiber ends may be flush with the signal surface 333 or extend a known distance from the signal surface 333 if laser cleaved. As described above with respect to the embodiments illustrated in FIGS. 1A-1G, for a flush design a temporary stop may be positioned against the signal surface 333 such that the ends of the first and second optical fibers 156a and 156b abut the temporary stop and are positioned at the fiber end regions 375a and 375b of the first and second fiber installation features 330a and 330b. The first and second optical fibers 156a and 156b may then be secured within the first and second fiber installation features 330a and 330b with a transparent, index-matching adhesive material. In another embodiment, a temporary stop may not be utilized, but rather the optical fibers may be cleaved such that their ends are positioned within the fiber end regions 375a/375b (e.g., by a laser).

In one embodiment, a light baffle 347 extending from the signal surface 333 may be utilized to further minimize any optical cross talk between optical signals propagating within the first and second optical fibers 156a and 156b. The light baffle 347, which is substantially opaque to the optical signals within the first and second optical fibers 156a and 156b, may be positioned between the fiber end regions 375a and 375b. It should be understood that the light baffle 347 may be configured as other shapes, such as "V" shaped, rounded, or knife-edged.

The fiber securing device 322 is mechanically coupled to the collar 360, thereby aligning the ends of the first and second optical fibers 156a and 156b with respect to the light emitting component 141 and the light receiving component 142 because the light emitting component 141 and the light receiving component 142 are positioned on the active component substrate 127 with respect to the collar 360 via a vision system. The male conical and oval shape of the engagement surface 348 of the fiber securing device 322 is configured to engage the female conical and oval shape of the inner wall 362. The light baffle 347 may be positioned into the slot of the active component substrate 327 when the fiber securing device 322 is coupled to the collar 360. In one embodiment, the fiber securing device 322 is coupled to the collar 360 and the active component substrate 327 by an index-matching material. In an alternative embodiment, the fiber securing device 322 is coupled to the collar 360 by mechanical features, such as by snap-fit.

The illustrated, exemplary fiber securing device 322 further comprises a first tab 345 and a second tab 346. The second tab 346 is sized and positioned on a side of the fiber securing device 322 to close off the collar gap 364 formed by the non-continuous inner wall 362. The second tab 346 may also provide a mechanical keying feature that permits assembly in only one orientation of the fiber securing device 322 to the collar 360. The second tab 346 may ensure that the fiber securing device 322 is coupled to the collar 360 such that the signal surface 333 is a predetermined distance d (height) measured from the surface 323 of the active component substrate 327. The first tab 345 may also provide mechanical keying functionality.

Referring now to FIG. 3D, the collar 360 acts as an alignment component that aligns the fiber end regions 375a and 375b to predetermined active optical locations with respect to the active optical components (i.e., the light emitting component 141 and the light receiving component 142). The ends of the optical fibers 156a and 156b are therefore aligned in x-, y-, and z-axis directions with respect to the light emitting component 141 and the light receiving component 142. The predetermined height in the z-axis is established by the engagement of the fiber securing device 322 with the collar 360 such that the signal surface 333 is the predetermined distance d from the surface 323 of the active component substrate 327. The x- and y-axis coordinates of the ends of the first and second optical fibers 156a and 156b are also established by the mechanical engagement of the fiber securing device 322 with the collar 360, and that the light emitting component 141 and the light receiving component 142 are coupled to the active component substrate 327 using the inner wall 362 of the collar 360 as a reference. In this manner, the fiber end region(s) of the fiber securing device may be substantially located at a predetermined optical coupling location with respect to an active optical component, such as a light emitting component or a light receiving component. Accordingly, the fiber securing device and the collar may substantially align an end of an optical fiber with an active component for optical signal transmission.

Figure 4A:
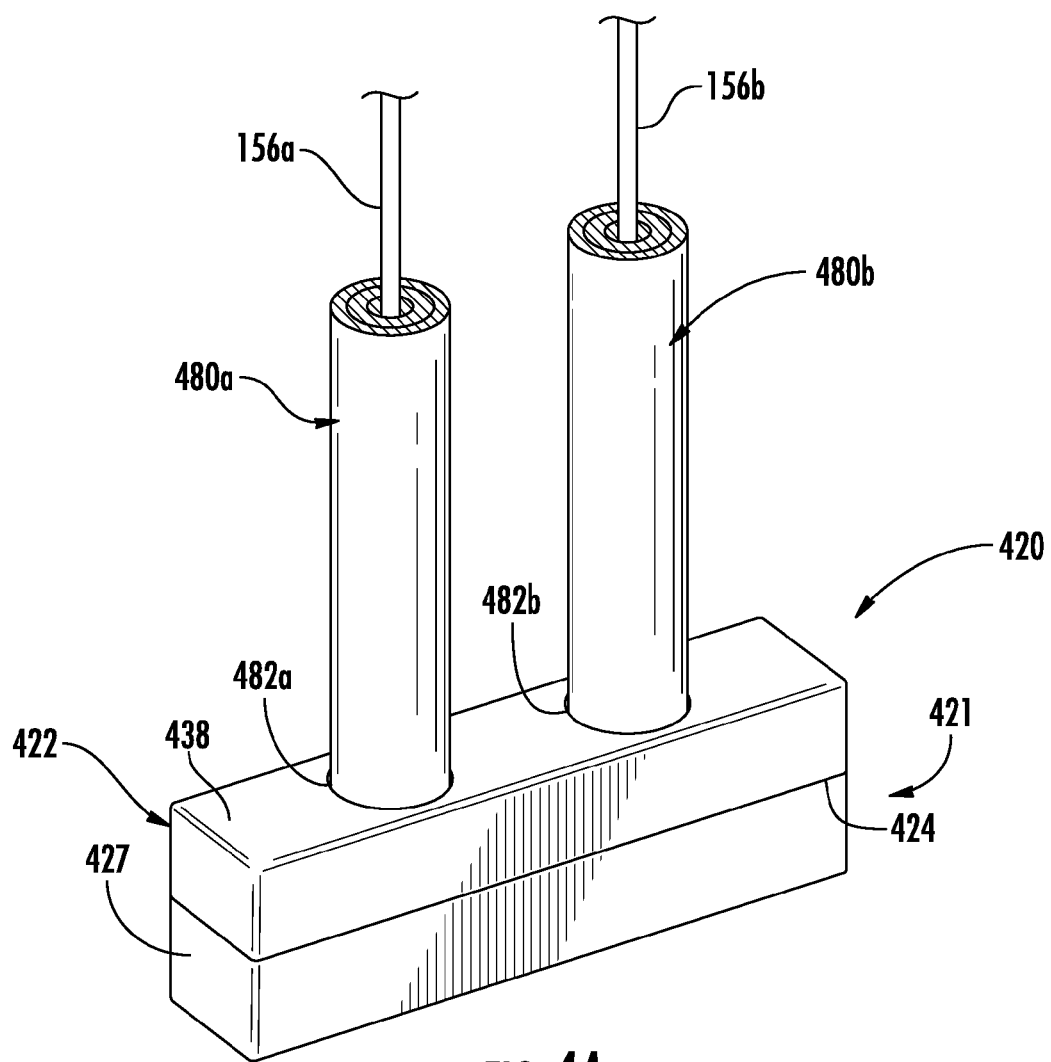
FIG. 4A schematically depicts a front, top perspective view of an optical component assembly having a holder device and two fiber securing devices according to one or more embodiments shown and described herein.
Figure 4B:
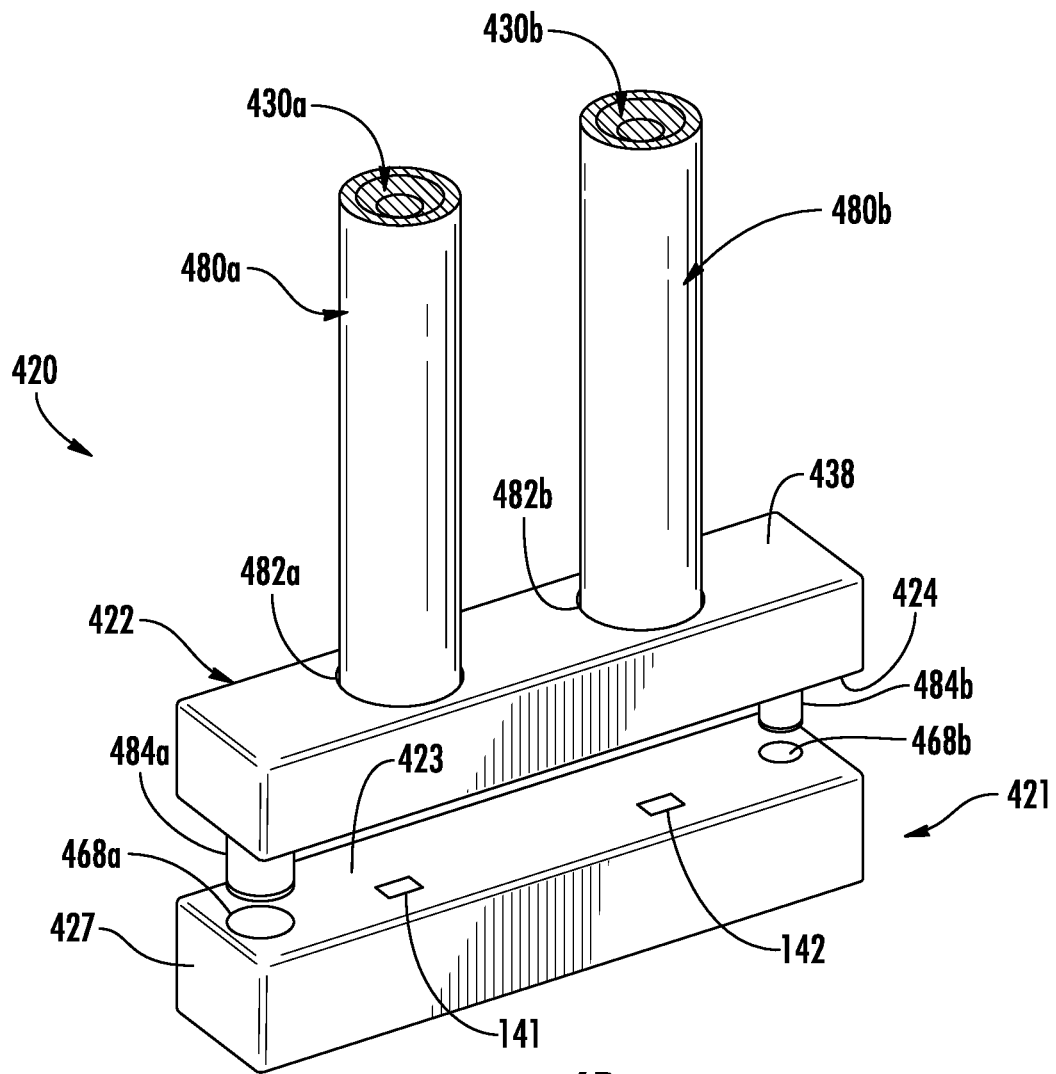
FIG. 4B schematically depicts a partially exploded, top perspective view of the optical component assembly depicted in FIG. 4A according to one or more embodiments shown and described herein.

Referring now to FIGS. 4A-4E, another embodiment of an optical component assembly 420 is illustrated. The illustrated optical component assembly 420 generally comprises an active component assembly 421 and a fiber securing assembly configured as a holder device 422, a first fiber securing device 480a, and a second fiber securing device 480b. In one embodiment, the first and second fiber securing devices 480a and 480b are cylindrical ferrules. Referring specifically to FIG. 4B, the active component assembly 421 comprises an active component substrate 427 having a first active optical component (e.g., a light emitting component 141) and a second active optical component (e.g., a light receiving component 142) coupled thereto at a predetermined first location (e.g., a light emitting component) and a predetermined second location (e.g., a light receiving component location) along the x-axis and the y-axis, respectively. More or fewer active optical components may be provided. Optical component assemblies having both a light emitting component and a light receiving component may be referred to as optical transceiver assemblies, and the active component assembly 421 a transceiver substrate assembly. The active component substrate 427 may be made from a dielectric material, such as FR-4, for example.

The exemplary active component substrate 427 has two pin holes 468a and 468b to receive coupling pins 484a and 484b of the holder device 422 as described in more detail below. More or fewer pin holes may be utilized to secure the holder device 422 to the active component assembly 421.

The active component substrate 427 may further comprise castellations and electrically conductive bond pads as described above to electrically couple the optical component assembly 420 to the mother printed circuit board 113 and/or prevent electrical cross-talk between the active optical components.

The holder device 422 may be configured as a rectangular plastic molded component that is substantially opaque to the wavelength of optical radiation emitted and received by the light emitting component 141 and the light receiving component 142. The holder device generally comprises a first fiber-locating hole 482a and a second fiber-locating hole 482b that extend from a first surface 424 to a second surface 438, two coupling pins 484a and 484b, and an active optical component recess 487 at the first surface 424.

Figure 4C:
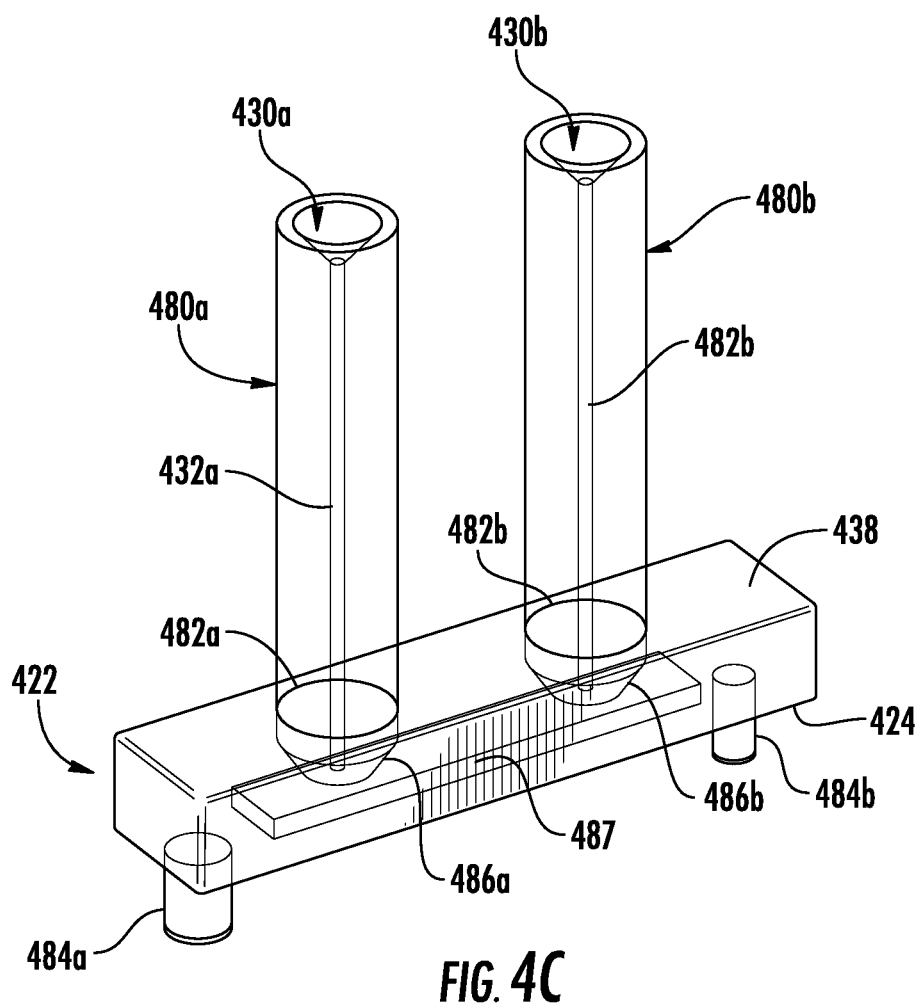
FIG. 4C schematically depicts a transparent, top perspective view of a fiber securing assembly of the optical component assembly depicted in FIG. 4A according to one or more embodiments shown and described herein.
Figure 4D:
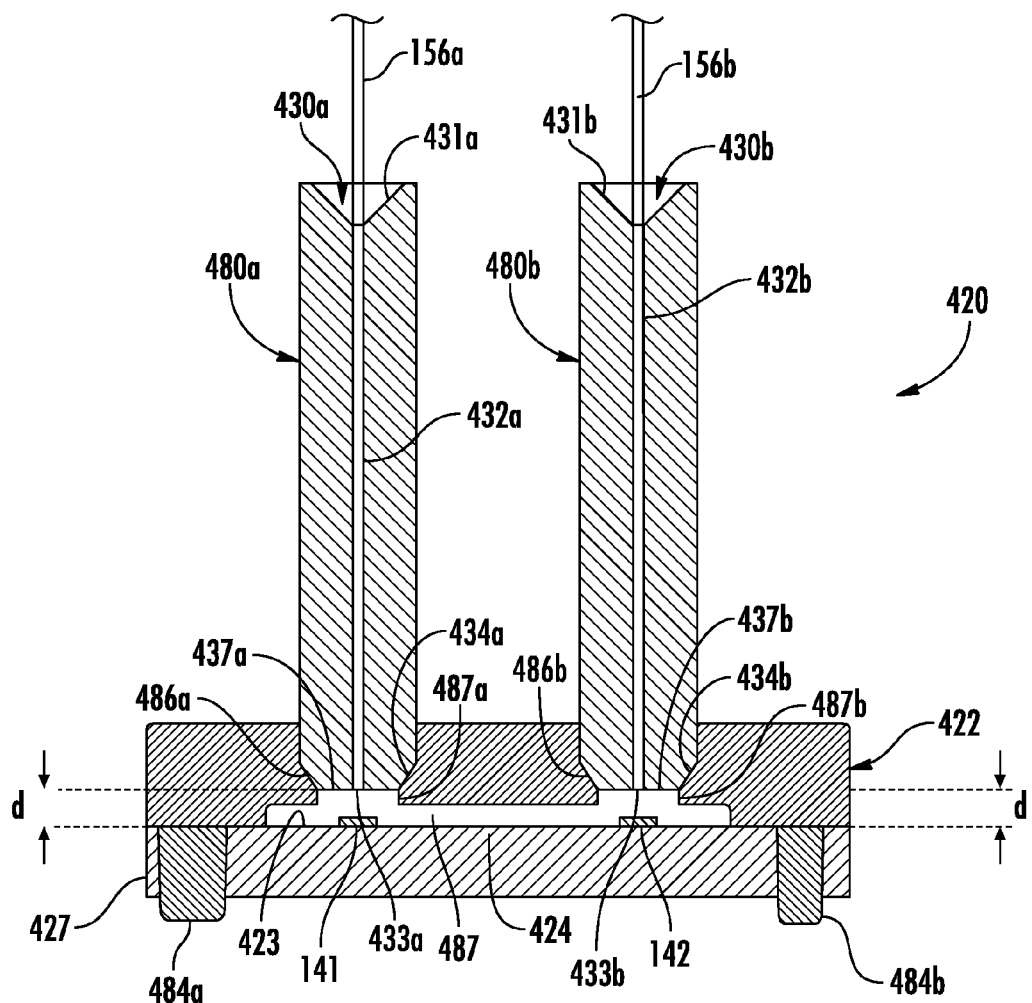
FIG. 4D schematically depicts a cross-sectional view of the optical component assembly depicted in FIG. 4A according to one or more embodiments shown and described herein.
Figure 4E:
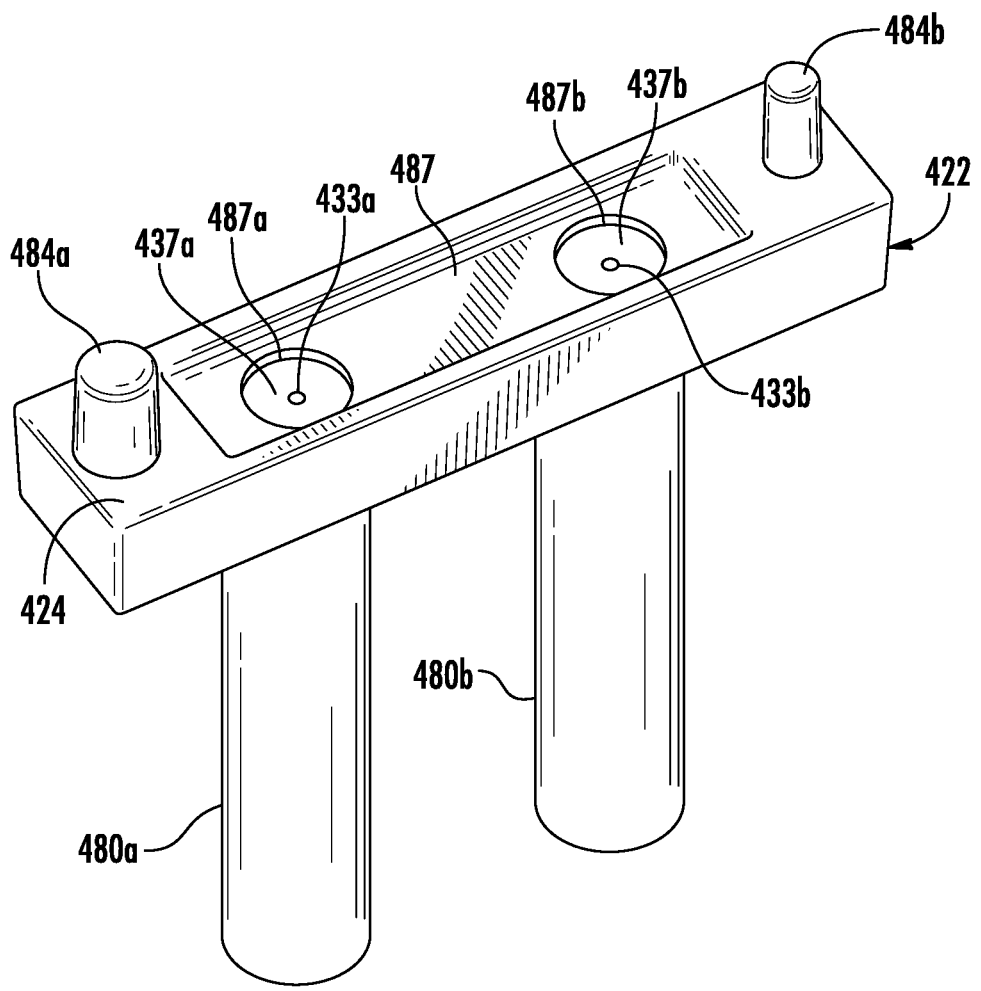
FIG. 4E schematically depicts a front, bottom perspective view of the optical component assembly depicted in FIG. 3A according to one or more embodiments shown and described herein.

The first fiber-locating hole 482a and second fiber-locating hole 482b are precision holes that are dimensioned to accept the first fiber securing device 480a and the second fiber securing device 480b, respectively. Referring to FIGS. 4C and 4D, the first and second fiber-locating holes 482a, 482b have an engagement feature 486a, 486b proximate to the active optical component recess 487. The engagement feature 486a, 486b, which may comprise a chamfered region in one embodiment, may be configured to mate with an engagement surface of a fiber securing device 480a, 480b, as described below. Other arrangements may also be utilized. For example, the engagement feature may be configured as a circumferential rim upon which a corresponding circumferential rim or structure of the first and second fiber securing devices may rest.

The active optical component recess 487 may be configured in a variety of geometrical configurations and should be such that, when the holder device 422 is coupled to the active component substrate 427, the light emitting component 141 and the light receiving component 142 are maintained within the active optical component recess 487. The illustrated optical component recess 487 further comprises a light emitting component hole 487a and a light receiving component hole 487b of which the first and second fiber securing devices 480a, 480b contact when inserted into the holder device 422 and are located in the respective stop positions (see FIGS. 4D and 4E). In an alternative embodiment, at least a portion of the active optical component recess 487 may extend to one or more sides of the holder device 422 to provide an epoxy vent path through which excess index matching epoxy may flow.

The coupling pins 484a and 484b may extend from the first surface 424 of the holder device 422. As shown in FIG. 4B, the coupling pins 484a and 484b are configured to be inserted into the pin holes 468a and 468b of the active component substrate 427. In one embodiment, the coupling pins 484a and 484b have different diameters such that that holder device 422 may be coupled to the active component substrate 427 in only one orientation. The diameters of the coupling pins 484a, 484b may be smaller than the diameters of the corresponding pin holes 468a, 468b such that the coupling pins 484a, 484b loosely fit within the pin holes 468a, 468b to achieve rough alignment between the holder device 422 and the active component substrate 427.

In one embodiment, the first and second fiber securing devices 480a and 480b may be similar to the first and second fiber securing devices 122a and 122b illustrated in FIGS. 1A-1G. More or fewer fiber securing devices may be utilized depending on the number of active components in the optical component assembly. The first and second fiber securing devices 480a and 480b have an engagement surface 434a, 434b that substantially matches the engagement features 486a, 486b of the holder device 422 such that the engagement surfaces 434a, 434a mate with the engagement features 486a, 486b when the fiber securing devices 480a and 480b are coupled to the holder device 422.

Referring to FIG. 4D, the first and second fiber securing devices 480a, 480b are configured to receive and secure an optical fiber, such as first and second optical fibers 156a and 156b shown in FIG. 4A. The first and second fiber securing devices 480a, 480b may be configured as a ceramic ferrule having a fiber installation feature 430a, 430b, respectively, fully extending therethrough. The fiber installation features 430a, 430b comprise a fiber insertion region 431a/431b, a close-fitting region 432a/432b, and a fiber end region 433a/433b. The fiber insertion region 431a/431b may be frusto-conical in shape to aid in guiding the optical fiber 156a/156b into the first and second fiber securing devices 480a, 480b. The close-fitting regions 432a/432b may have a diameter that is substantially similar to that of an outside diameter of the optical fibers 156a/156/b such that the optical fibers are maintained within the close-fitting regions without substantial freedom of movement. The fiber end region 433a/433b of the first and second fiber installation features 430a, 430b is an opening at a signal surface 437a/437b of the first and second fiber securing devices 480a, 480b such that the fiber end regions 433a, 433b act as a first signal aperture and a second signal aperture.

In one embodiment, the first optical fiber 156a is inserted into the first fiber securing device 480a and the second optical fiber 156b is inserted into the second securing device 480b such that the first second optical fibers extend beyond the first and second signal aperture, respectively. The first and second optical fibers 156a, 156b may be cleaved off at a precise distance with respect to the signal surface 437a/437b (or flush with the signal surface 437a/437b in some embodiments). The optical fibers may be secured within the fiber securing devices with an adhesive.

In one embodiment, the light emitting component 141 and the light receiving component 142 may be first die-attached to the active component substrate 427 using a vision die-attach system that uses reference features on the active component substrate 427 as fiducial references (e.g., metal traces in the shape of a circular ring). The holder device 422 may be positioned onto the active component substrate 427 with the vision die-attach system using the light emitting component 141 and the light receiving component 142 as fiducial references to precisely align the holder device 422 with respect to the light emitting component 141 and the light receiving component 142. In this embodiment a "look down" vision alignment method is used such that the vision system looks down through the light emitting component hole 487a and/or the light receiving component hole 487b to see the light emitting component 141 and/or light receiving component 142 for accurate placement of the holder device 422. Accordingly, this embodiment may not require a "look up/look down" vision alignment method in which one camera looks up at the item to be positioned and a second camera looks down at the placement surface, wherein an overlapping of the images indicates an alignment. However, some embodiments may utilize such as "look up/look down" approach.

The coupling pins 484a and 484b are then positioned within the pin holes 468a and 468b. In one embodiment, while the holder device 422 is temporarily held in place by the vision die-attach system, the holder device 422 is tacked in place using UV curing adhesive on the coupling pins 484a and 484b in the loose-fitting pin holes 468a and 468b followed by a structural adhesive later in the process.

The active optical component recess 487 may be filled with an index matching adhesive and the first and second fiber securing devices 480a, 480b (having the first and second optical fibers 156a and 156b positioned therein) positioned within the first and second fiber-locating holes 482a and 482b. The engagement surface 434a/434b of the first and second fiber securing devices 480a and 480b (e.g., a chamfer or a square shoulder) determines the depth that the first and second fiber securing devices 480a and 480b are inserted into the first and second fiber-locating holes 482a and 482b. As shown in FIG. 4D, the engagement end of the first and second fiber securing devices 480a and 480b abuts the light emitting component hole 487a and the light receiving component hole 487b to establish the signal surface 437a/437b of the first and second fiber securing device 480a and 480b at a predetermined distance d (height) measured from the surface 423 of the active component substrate 427. In one embodiment, a vent hole (not shown) is provided in the holder device 422 to allow excess index matching adhesive to escape.

The holder device 422 acts as an alignment component that aligns the fiber end regions 433a and 433b with respect to predetermined active optical locations of the active optical components (i.e., the light emitting component 141 and the light receiving component 142). The ends of the optical fibers 156a and 156b are aligned in x-, y-, and z-axis directions with respect to the light emitting component 141 and the light receiving component 142. The precisely-located fiber-locating holes 482a and 482b and the placement of the holder device 422 with respect to the light emitting component 141 and/or the light receiving component 142 establish the x- and y-axis positions of the ends of the first and second optical fibers 156a and 156b. The predetermined height in the z-axis is established by the engagement of the first and second fiber securing devices 480a and 480b with the engagement features 486a and 486b of the holder device 422 such that the signal surface 437a/437b is the predetermined distance d from the surface 423 of the active component substrate 427. In this manner, the fiber end region(s) of the fiber securing device may be substantially located at a predetermined optical coupling location (e.g., predetermined first and second location) with respect to an active optical component, such as a light emitting component or a light receiving component. Accordingly, the fiber securing devices and the holder device may substantially align an end of an optical fiber with an active component for optical signal transmission.

It should now be understood that embodiments described herein may precisely couple an end of an optical fiber to an active optical component, such as a light emitting component or a light receiving component, using relatively low cost components. Embodiments may comprise an active component assembly comprising an active component substrate having active optical components coupled thereto, and a fiber securing assembly into which optical fibers may be inserted. Alignment features are provided to substantially align ends of the optical fibers (or fiber) with the active component(s).

It is noted that terms like "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "approximately" and "about" are utilized herein to represent the inherent degree of uncertainty that may be attributed to any quantitative comparison, value, measurement, or other representation.

What is claimed is:

1. An optical transceiver assembly comprising:
   an active component assembly comprising an active component substrate comprising at least two pin holes, a first active optical component, and a second active optical component, wherein the first active optical component and the second active optical component are coupled to the active component substrate;
      a first fiber securing device comprising a first fiber installation feature, the first fiber installation feature comprising a first signal aperture, and an engagement surface at an engagement end of the first fiber securing device, the engagement surface comprising a shoulder;
      a second fiber securing device comprising a second fiber installation feature, the second fiber installation feature comprising a second signal aperture, and an engagement surface at an engagement end of the second fiber securing device, the engagement surface comprising a shoulder;
      a holder device coupled to the active component assembly, the holder device comprising:
   an active optical component recess at a first surface of the holder device, wherein the first active optical component and the second active optical component are positioned at the active optical component recess;
   a first fiber-locating hole and a second fiber-locating hole extending from a second surface to the active optical component recess, the first fiber-locating hole and the second fiber-locating hole comprising an engagement feature at the active optical component recess, wherein the first fiber securing device is maintained within the first fiber-locating hole and the second fiber securing device is maintained within the second fiber-locating hole such that the engagement surface of the first and second fiber securing devices contact the engagement feature of the first and second fiber-locating holes, respectively; and
   at least two coupling pins extending from the first surface of the holder device; wherein:
   a diameter of the at least two coupling pins is smaller than a diameter of the at least two pin holes;
   the at least two coupling pins are positioned within the at least two pin holes; and
   the holder device is mechanically coupled to the active component substrate such that the first signal aperture of the first fiber securing device and the second signal aperture of the second fiber securing device are substantially located at a predetermined distance d from a surface of the active component substrate, the first signal aperture of the first fiber securing device is substantially located at a predetermined first location with respect to the first active optical component along an x-axis and a y-axis, and the second signal aperture of the second fiber securing device is substantially located at a predetermined second location with respect to the second active optical component along the x-axis and the y-axis, and a predetermined height in the Z-axis is established by the engagement of the first and second fiber securing devices with the engagement features of the holder device.

2. The optical transceiver assembly of claim 1, wherein the holder device is placed on the active component substrate by a vision system.

3. The optical transceiver assembly of claim 1, wherein the engagement feature of the holder device comprises a chamfered region.

4. The optical transceiver assembly of claim 1, wherein the engagement feature of the holder device comprises a rim.

5. The optical transceiver assembly of claim 1, wherein the active optical component recess is filled with an index-matching epoxy material.

6. The optical transceiver assembly of claim 1, wherein the first and second fiber installation features each further comprise a fiber insertion region and a fitting region.

7. The optical transceiver assembly of claim 1, wherein the active component substrate further comprises a plurality of electrically conductive vias located between the first active optical component and the second active optical component.

8. The optical transceiver assembly of claim 1, wherein the fiber securing device is cylindrical.

9. The optical transceiver assembly of claim 1, wherein:
   the first and second fiber installation features each comprise a fiber insertion region and a fitting region; and
   a diameter of the fiber insertion region is larger than a diameter of the fitting region.

\* \* \* \* \*